United States Patent
Rausch et al.

(10) Patent No.: US 12,502,937 B2
(45) Date of Patent: Dec. 23, 2025

(54) VEHICLE WITH IMPROVED CAB VISIBILITY

(71) Applicant: Oshkosh Corporation, Oshkosh, WI (US)

(72) Inventors: Andrew Rausch, Oshkosh, WI (US); Jon Zeamer, Oshkosh, WI (US); Jeremy Andringa, Oshkosh, WI (US); Greg Steffens, Oshkosh, WI (US); Josh Gentner, Oshkosh, WI (US); Jon Branson, Oshkosh, WI (US); Jeff Verhagen, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 490 days.

(21) Appl. No.: 18/110,986

(22) Filed: Feb. 17, 2023

(65) Prior Publication Data
US 2023/0311625 A1    Oct. 5, 2023

Related U.S. Application Data

(60) Provisional application No. 63/325,632, filed on Mar. 31, 2022.

(51) Int. Cl.
*B60J 5/04* (2006.01)
*B60J 1/02* (2006.01)
(Continued)

(52) U.S. Cl.
CPC ............... *B60J 5/0419* (2013.01); *B60J 1/02* (2013.01); *B60J 1/10* (2013.01); *B60J 5/0402* (2013.01);
(Continued)

(58) Field of Classification Search
CPC .......... B60J 5/0419; B60J 1/10; B60J 5/0487; B62D 33/06
See application file for complete search history.

(56) References Cited

U.S. PATENT DOCUMENTS

| | | |
|---|---|---|
| 1,754,257 A | 4/1930 | Britt |
| 3,934,644 A | 1/1976 | Johnston |
| | (Continued) | |

FOREIGN PATENT DOCUMENTS

| | | | |
|---|---|---|---|
| CN | 111890891 A | * 11/2020 | ................. B60J 1/10 |
| CN | 116834522 A | * 10/2023 | ............. B60J 5/0419 |
| | (Continued) | | |

OTHER PUBLICATIONS

Translation of CN111890891A.*
(Continued)

*Primary Examiner* — Jason S Morrow
(74) *Attorney, Agent, or Firm* — Foley & Lardner LLP

(57) ABSTRACT

A cab for a refuse vehicle includes a cab body defining a first door opening and a second door opening, a first door positioned over the first door opening, and a second door positioned over the second door opening. Each of the first door and the second door includes a door panel and a peep window positioned proximate a lower end of the door panel. The peep window includes an interior windowpane and exterior windowpane. Portions of the interior windowpane and the exterior windowpane are vertically offset and horizontally offset.

20 Claims, 25 Drawing Sheets

(51) Int. Cl.
    *B60J 1/10* (2006.01)
    *B60S 1/04* (2006.01)
    *B60S 1/08* (2006.01)
    *B62D 33/06* (2006.01)
    *B65F 3/00* (2006.01)
(52) U.S. Cl.
    CPC .............. *B60S 1/043* (2013.01); *B60S 1/08* (2013.01); *B62D 33/06* (2013.01); *B65F 3/00* (2013.01)

(56) References Cited

U.S. PATENT DOCUMENTS

| | | | |
|---|---|---|---|
| 4,611,796 A | 9/1986 | Orr | |
| 4,648,775 A | 3/1987 | Verner | |
| 5,078,448 A | 1/1992 | Selzer et al. | |
| 5,317,880 A | 6/1994 | Spears | |
| 5,501,567 A | 3/1996 | Lanzdorf et al. | |
| 5,536,062 A | 7/1996 | Spears | |
| 5,653,493 A | 8/1997 | Spears | |
| 6,099,069 A | 8/2000 | Spears | |
| 8,944,016 B2 | 2/2015 | Hallqvist et al. | |
| 10,214,252 B2 | 2/2019 | Schellekens et al. | |
| 10,941,695 B2 | 3/2021 | Tholander et al. | |
| 10,946,906 B2 | 3/2021 | Pereira et al. | |
| 11,345,219 B2* | 5/2022 | Getzschman | B60J 5/0402 |
| 2002/0073626 A1* | 6/2002 | Ringger | B60J 5/0419 49/502 |
| 2005/0040668 A1 | 2/2005 | Wood | |
| 2006/0207207 A1* | 9/2006 | Bang | B21D 39/021 52/632 |
| 2008/0053129 A1 | 3/2008 | Follette et al. | |
| 2012/0098215 A1 | 4/2012 | Rositch et al. | |
| 2013/0249183 A1 | 9/2013 | Ellifson et al. | |
| 2013/0300073 A1 | 11/2013 | Venton-Walters et al. | |
| 2014/0265203 A1 | 9/2014 | Zuleger et al. | |
| 2014/0326555 A1 | 11/2014 | Ellifson et al. | |
| 2014/0334956 A1 | 11/2014 | Venton-Walters et al. | |
| 2015/0108787 A1 | 4/2015 | Schmidt | |
| 2015/0151651 A1 | 6/2015 | Stingle et al. | |
| 2015/0191069 A1 | 7/2015 | Zuleger et al. | |
| 2016/0096555 A1 | 4/2016 | Kantharaju et al. | |
| 2016/0167475 A1 | 6/2016 | Ellifson et al. | |
| 2016/0311253 A1 | 10/2016 | Palmer et al. | |
| 2016/0375805 A1 | 12/2016 | Krueger et al. | |
| 2017/0267052 A1 | 9/2017 | Zuleger et al. | |
| 2018/0056746 A1 | 3/2018 | Ellifson et al. | |
| 2019/0185077 A1 | 6/2019 | Smith et al. | |
| 2019/0276102 A1 | 9/2019 | Zuleger et al. | |
| 2019/0337350 A1 | 11/2019 | Ellifson et al. | |
| 2020/0062071 A1 | 2/2020 | Zuleger et al. | |
| 2020/0247486 A1 | 8/2020 | Groteleuschen et al. | |
| 2020/0256649 A1 | 8/2020 | Krueger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2020/0391569 A1 | 12/2020 | Zuleger | |
| 2021/0171137 A1 | 6/2021 | Zuleger et al. | |
| 2021/0276643 A1 | 9/2021 | Ellifson et al. | |
| 2021/0300143 A1 | 9/2021 | Zuleger | |
| 2021/0354329 A1 | 11/2021 | Hou et al. | |
| 2021/0380179 A1 | 12/2021 | Smith et al. | |
| 2021/0394578 A1 | 12/2021 | Ellifson et al. | |
| 2022/0063738 A1* | 3/2022 | Nelson | B65F 3/02 |
| 2022/0072736 A1 | 3/2022 | Steffens et al. | |
| 2022/0118854 A1 | 4/2022 | Davis et al. | |
| 2022/0134372 A1 | 5/2022 | Andringa | |
| 2022/0134856 A1 | 5/2022 | Andringa et al. | |
| 2022/0260344 A1 | 8/2022 | Krueger et al. | |
| 2022/0289290 A1 | 9/2022 | Andringa et al. | |
| 2022/0339987 A1 | 10/2022 | Zuleger et al. | |
| 2023/0070279 A1 | 3/2023 | Wheeler et al. | |
| 2023/0070769 A1 | 3/2023 | Wheeler et al. | |
| 2023/0074504 A1 | 3/2023 | Ellifson et al. | |
| 2023/0191887 A1* | 6/2023 | Rausch | B62D 1/12 180/65.1 |
| 2023/0192202 A1 | 6/2023 | Landvik et al. | |
| 2023/0415985 A1* | 12/2023 | Steffens | B65F 3/201 |
| 2023/0415986 A1* | 12/2023 | Steffens | B65F 3/201 |
| 2025/0128576 A1* | 4/2025 | Mielke | B60J 1/10 |

FOREIGN PATENT DOCUMENTS

| | | | | |
|---|---|---|---|---|
| EP | 2886034 A1 | * | 6/2015 | ......... A47L 15/4263 |
| JP | H05569 U | * | 1/1993 | |

OTHER PUBLICATIONS

Translation of CN116834522A.*
Translation of EP2886034A1.*
Translation of JPH05569U.*
https://info.macktrucks.com/refuse-revolution; "Welcome to the refuse revolution. Mack LR Electric." Retrieved on Mar. 21, 2023.
https://www.youtube.com/watch?v=NQFtAnm7D-c; "All-New Mack LR Electric Garbage Truck." Retrieved on Mar. 21, 2023.

* cited by examiner

VEHICLE WITH IMPROVED CAB VISIBILITY

CROSS-REFERENCE TO RELATED PATENT APPLICATION

This application claims the benefit of and priority to U.S. Provisional Patent Application No. 63/325,632, filed Mar. 31, 2022, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a cab for a refuse vehicle. The cab includes a cab body defining a first door opening and a second door opening, a first door positioned over the first door opening, and a second door positioned over the second door opening. Each of the first door and the second door includes a door panel and a peep window positioned proximate a lower end of the door panel. The peep window includes an interior windowpane and exterior windowpane. Portions of the interior windowpane and the exterior windowpane are vertically offset and horizontally offset.

Another embodiment relates to a cab for a refuse vehicle. The cab includes a front wall, a rear wall, a first sidewall extending between first ends of the front wall and the rear wall, a second sidewall extending between opposing second ends of the front wall and the rear wall, a windshield, a first door, and a second door. A first front corner is defined between the front wall and the first sidewall. A first rear corner is defined between the rear wall and the first sidewall. A second front corner is defined between the front wall and the second sidewall. A second rear corner is defined between the rear wall and the second sidewall. The first sidewall defines a first door opening. The second sidewall defines a second door opening. At least the front wall, the first front corner, and the second front corner cooperatively define a windshield opening. The windshield is received by the windshield opening. The windshield is configured as a single, continuous panel that extends across an entirety of the front wall and along at least the first front corner and the second front corner. The first door is positioned over the first door opening. The second door is positioned over the second door opening. Each of the first door and the second door includes a door panel and a peep window positioned beneath proximate a lower end of the door panel. The peep window includes an interior windowpane and exterior windowpane. One or more portions of the interior windowpane and one or more portions of the exterior windowpane are at least one of vertically offset or horizontally offset.

Still another embodiment relates to a cab for a refuse vehicle. The cab includes a front wall, a rear wall, a first sidewall extending between first ends of the front wall and the rear wall, a second sidewall extending between opposing second ends of the front wall and the rear wall, a windshield, a first rear window, a second rear window, a first door, and a second door. A first front corner is defined between the front wall and the first sidewall. A first rear corner is defined between the rear wall and the first sidewall. A second front corner is defined between the front wall and the second sidewall. A second rear corner is defined between the rear wall and the second sidewall. The first sidewall defines a first rear opening proximate the first rear corner and a first door opening. The second sidewall defines a second rear opening proximate the second rear corner and a second door opening. At least the front wall, the first front corner, and the second front corner cooperatively define a windshield opening. The windshield is received by the windshield opening. The windshield is configured as a single, continuous panel that extends across an entirety of the front wall and along at least the first front corner and the second front corner. The first rear window is received by the first rear opening. The second rear window received by the second rear opening. The first door is positioned over the first door opening. The second door is positioned over the second door opening. Each of the first door and the second door includes a door panel, an overhead window positioned proximate an upper end of the door panel, a main window positioned beneath the overhead window, and a peep window positioned beneath the main window and proximate a lower end of the door panel. The peep window includes an interior windowpane and exterior windowpane. One or more portions of the interior windowpane and one or more portions of the exterior windowpane are at least one of vertically offset or horizontally offset.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle, etc.) of the present disclosure includes a cab with various enhancements that provide improved operator visibility. The various enhancements may include (i) a single, continuous windshield that does not have a central window divider or split line and that has edges that curve onto the sidewalls of the cab, (ii) a cab door that includes an overhead window, a main side window, and a lower peep window where (a) the overhead window extends almost the entirety of the width of the cab door and (b) portions of an interior windowpane and an exterior windowpane of the lower peep window are vertically and/or horizontally offset from each other, (iii) rear corner windows positioned at the rear corners of the cab, (iv) a sprague radial-mounted wiper system, and (v) a low profile dashboard.

Overall Vehicle

Figure 1:
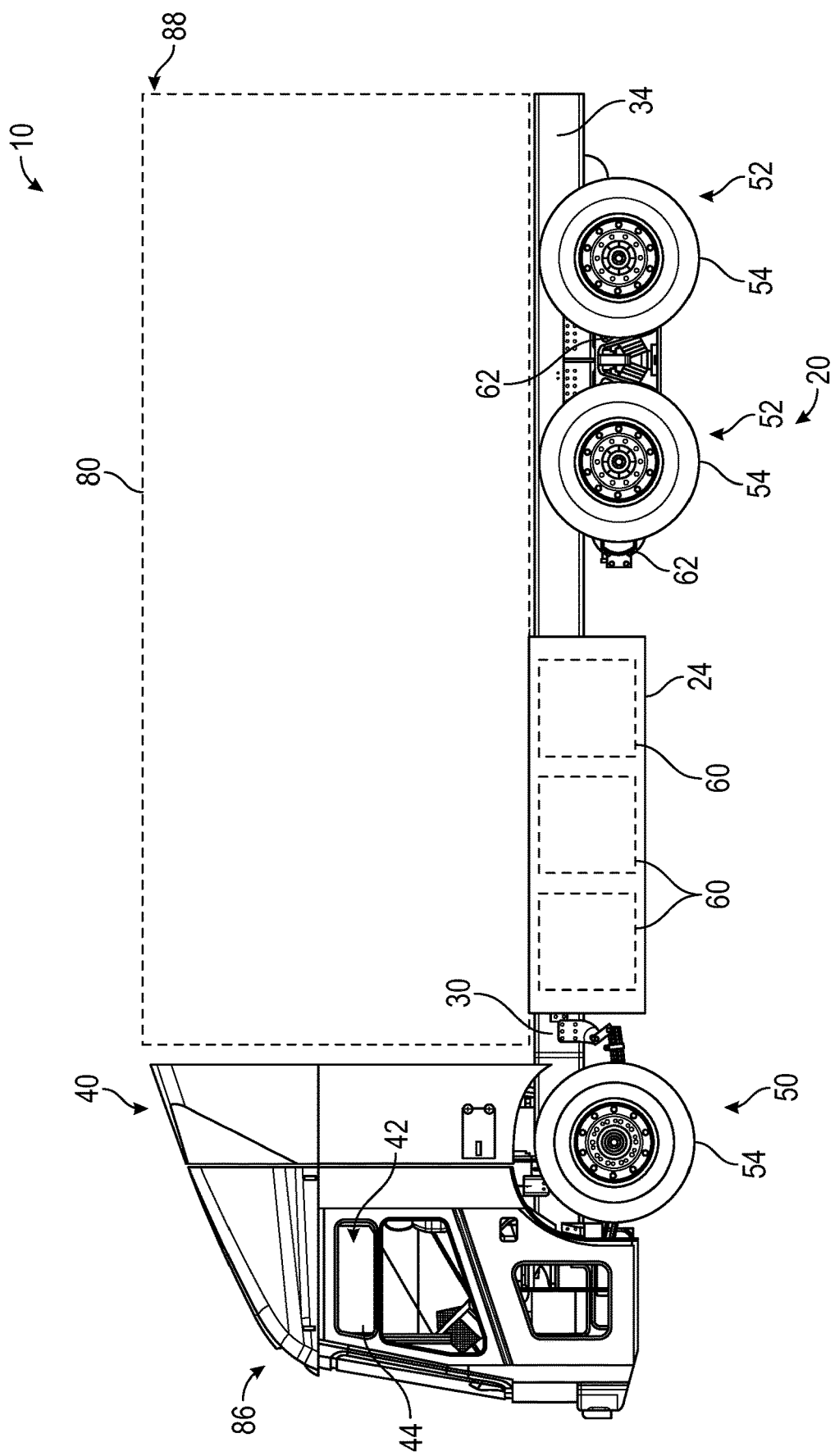
FIG. 1 is a left side view of a vehicle, according to an exemplary embodiment.
Figure 2:
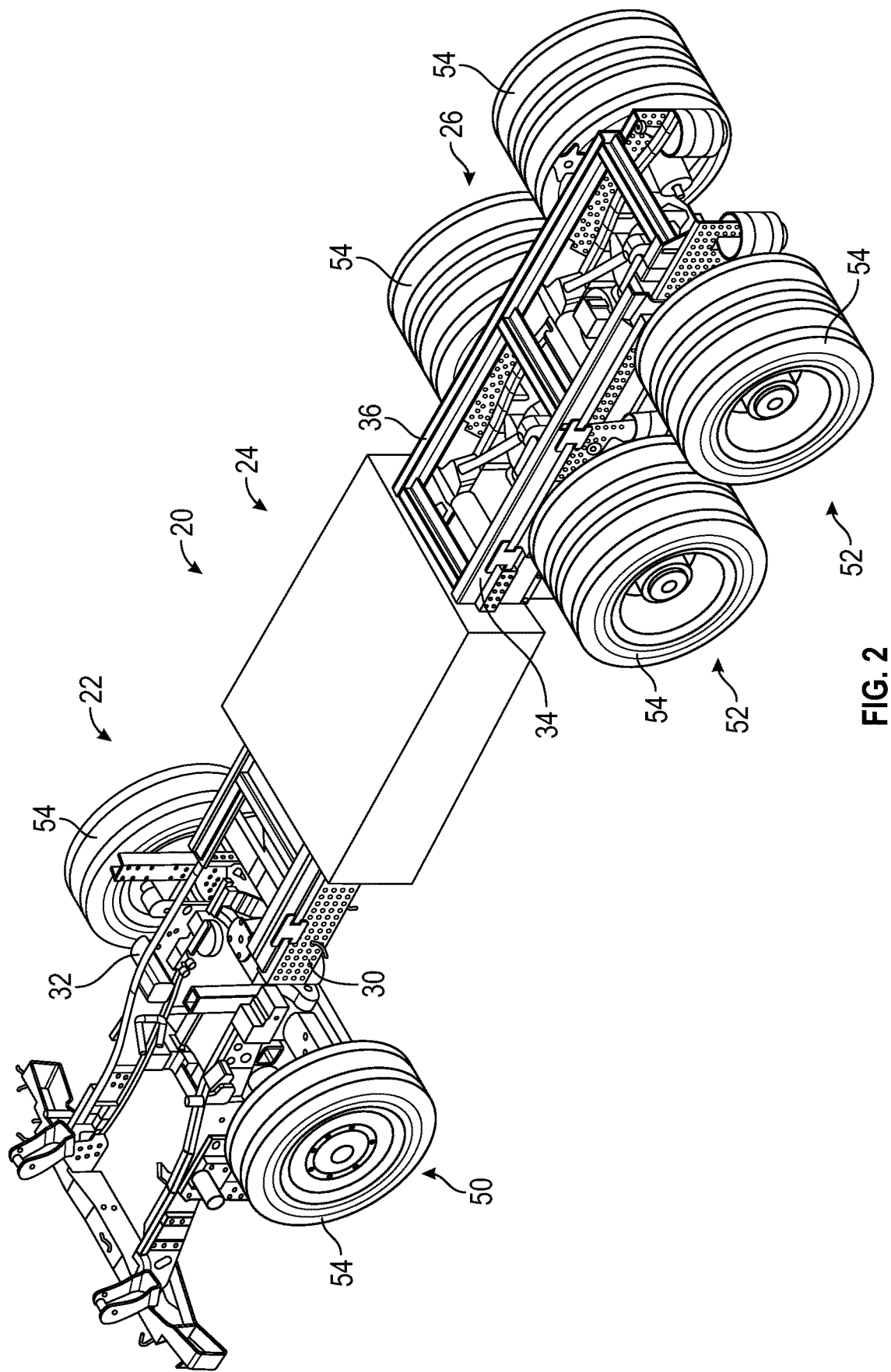
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20).

Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis 20. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
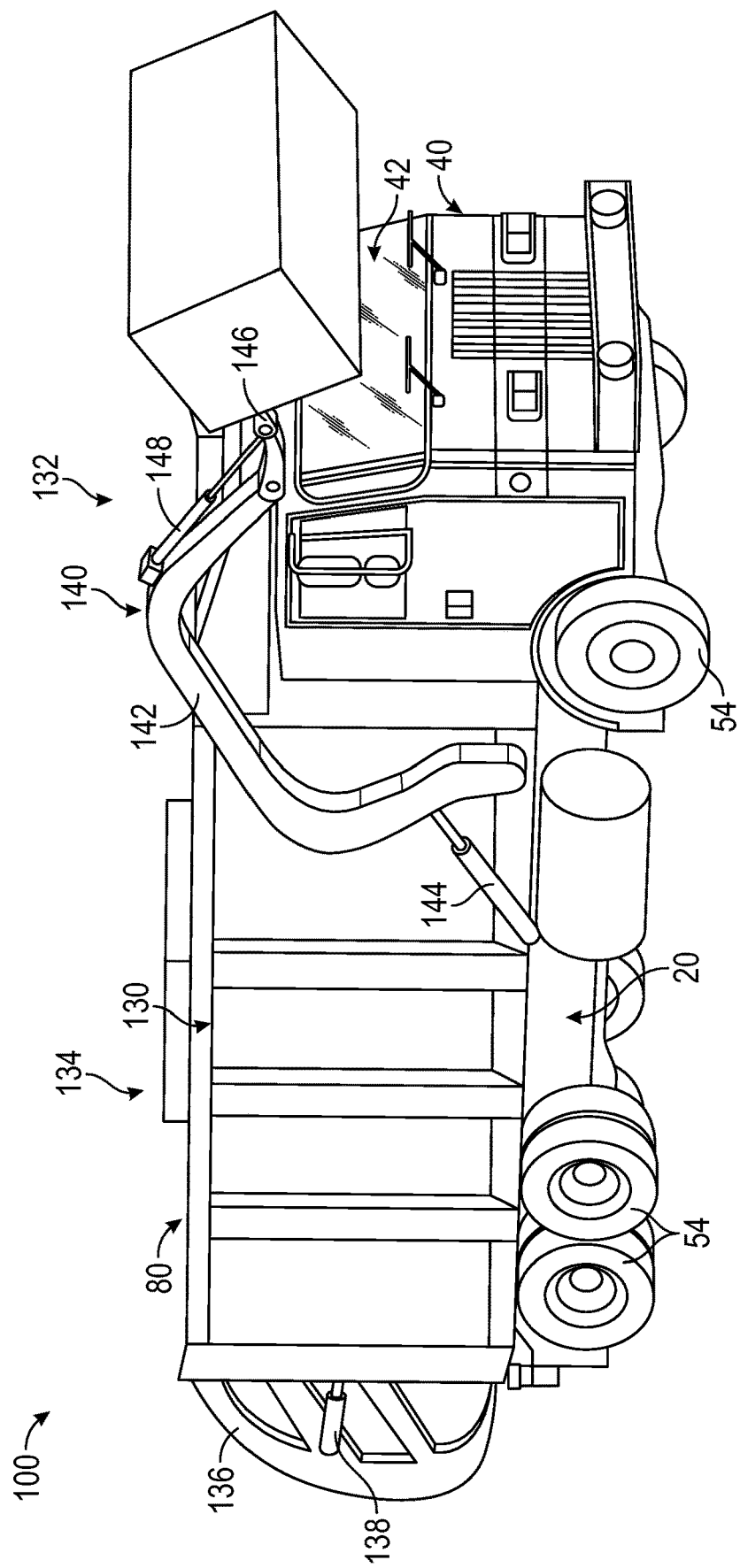
FIG. 3 is a perspective view of the vehicle of FIG. 1 configured as a front-loading refuse vehicle, according to an exemplary embodiment.
Figure 4:
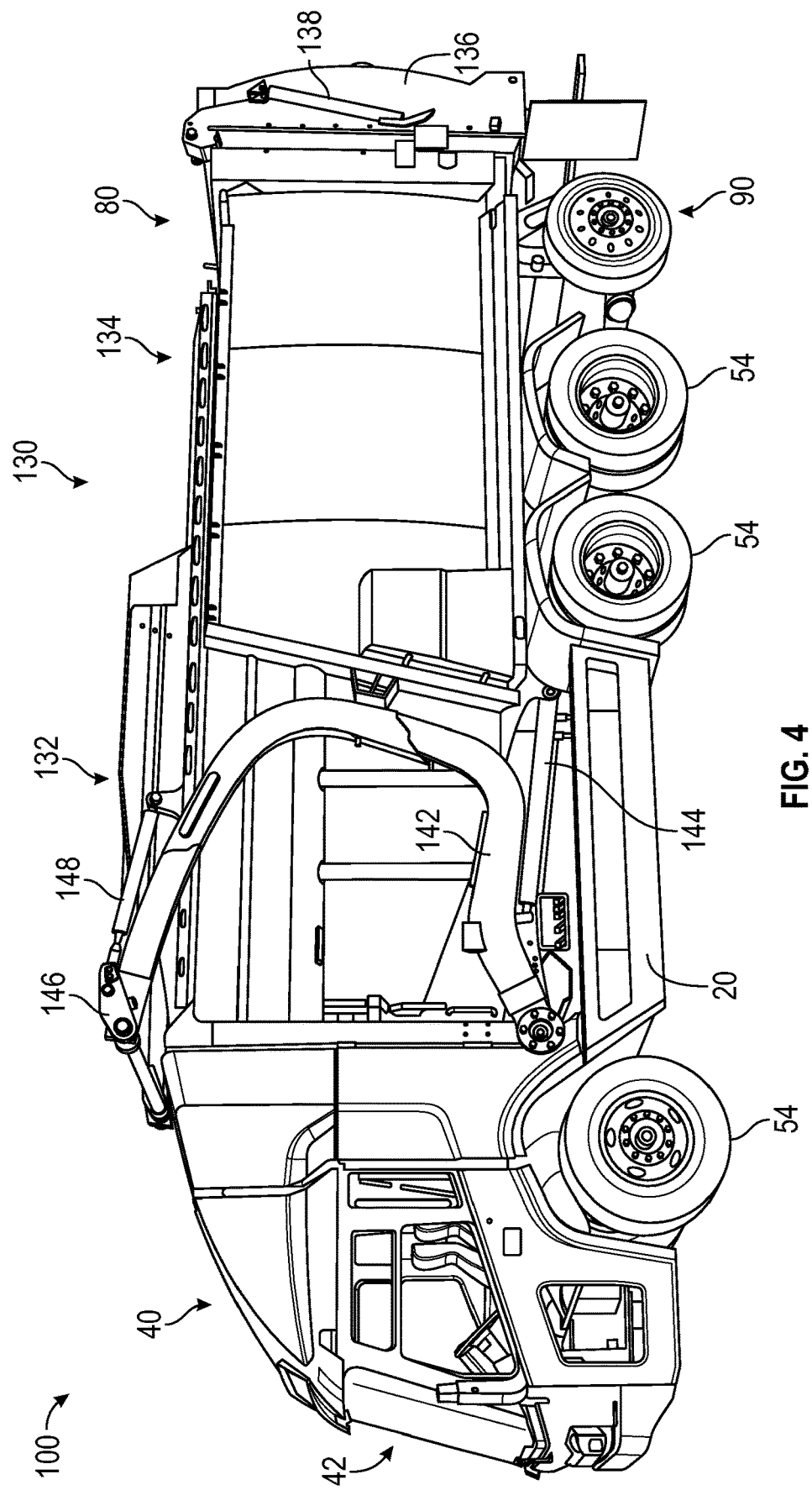
FIG. 4 is a left side view of the front-loading refuse vehicle of FIG. 3 configured with a tag axle.
Figure 5:
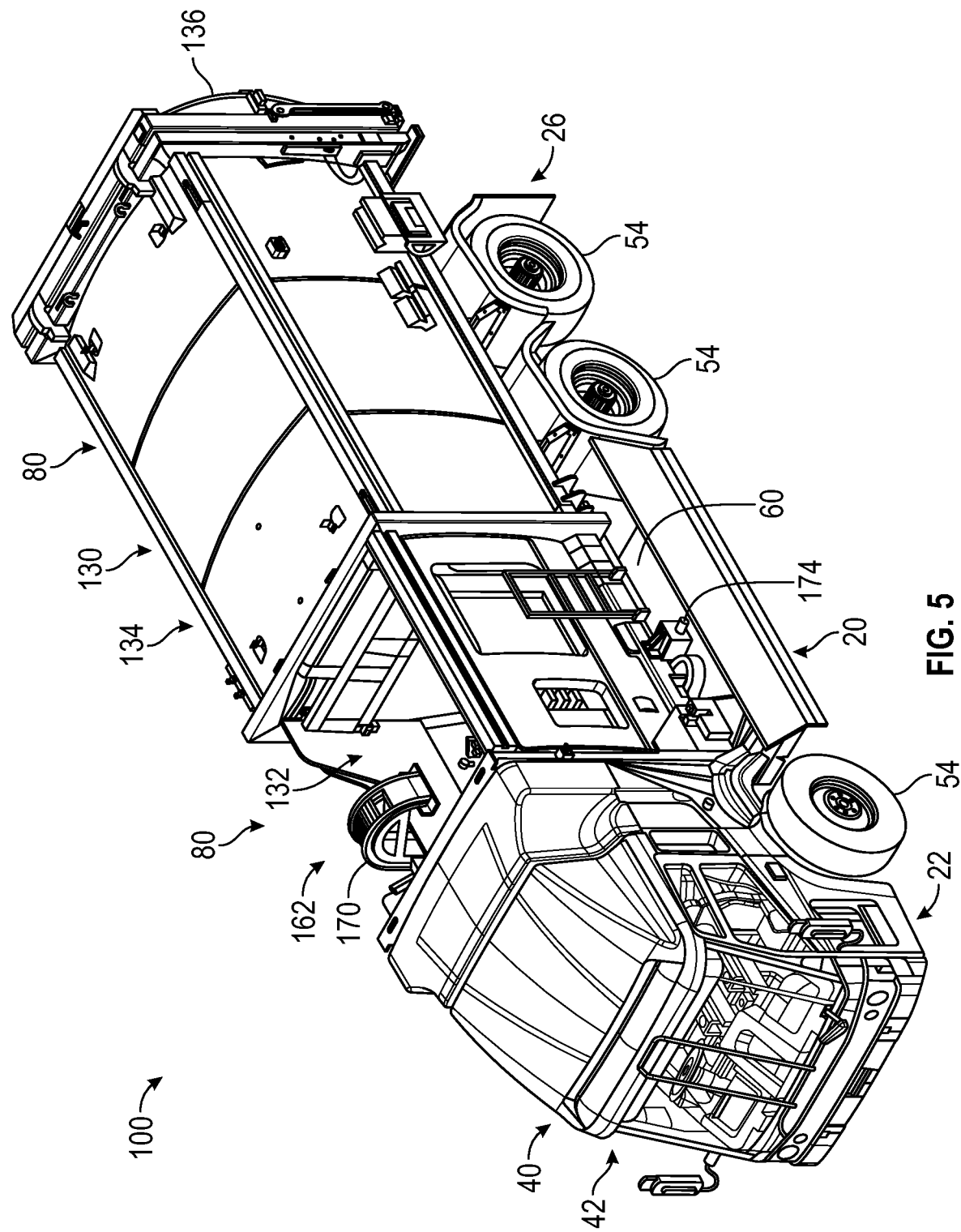
FIG. 5 is a perspective view of the vehicle of FIG. 1 configured as a side-loading refuse vehicle, according to an exemplary embodiment.
Figure 6:
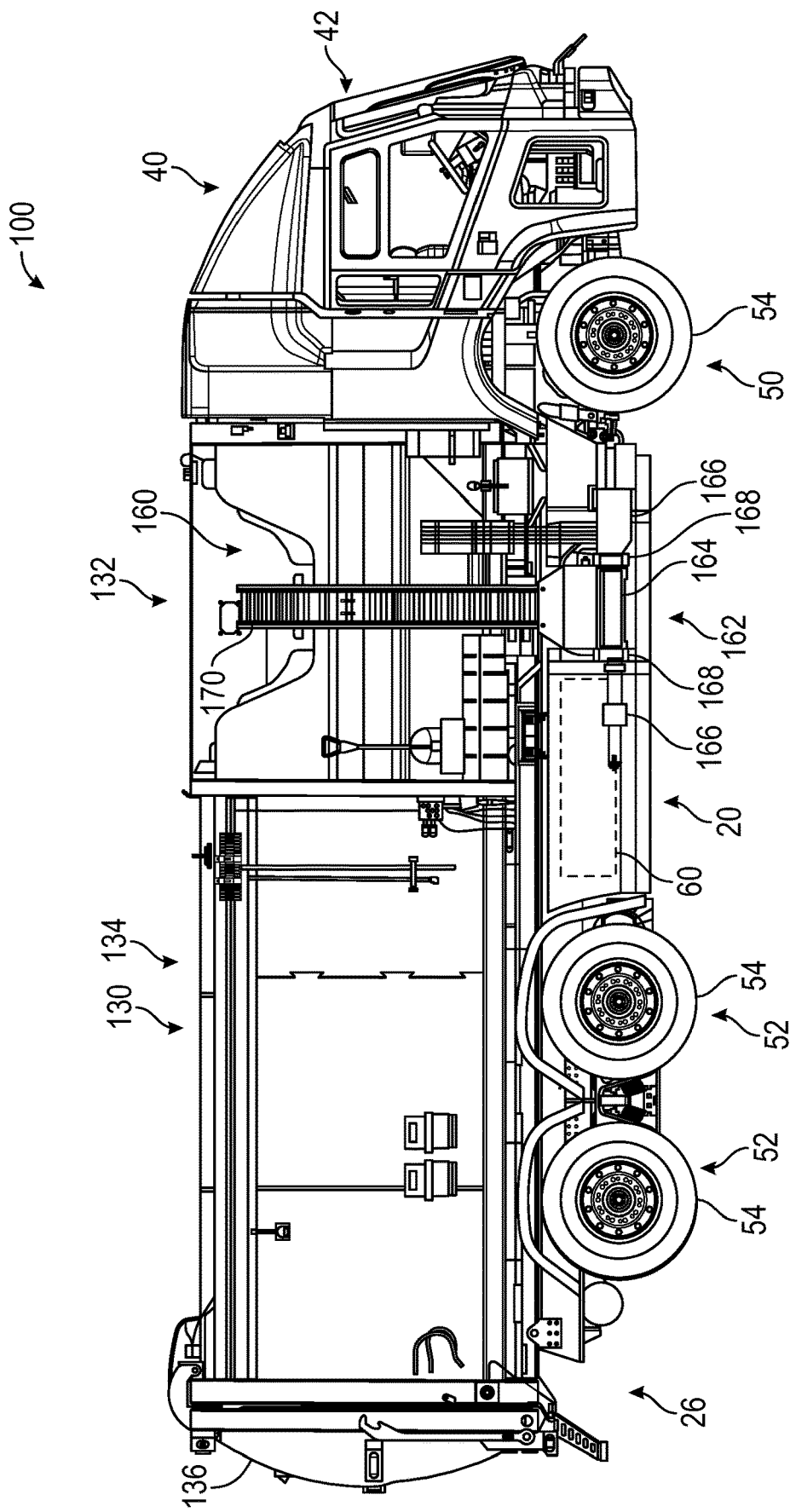
FIG. 6 is a right side view of the side-loading refuse vehicle of FIG. 5.
Figure 7:
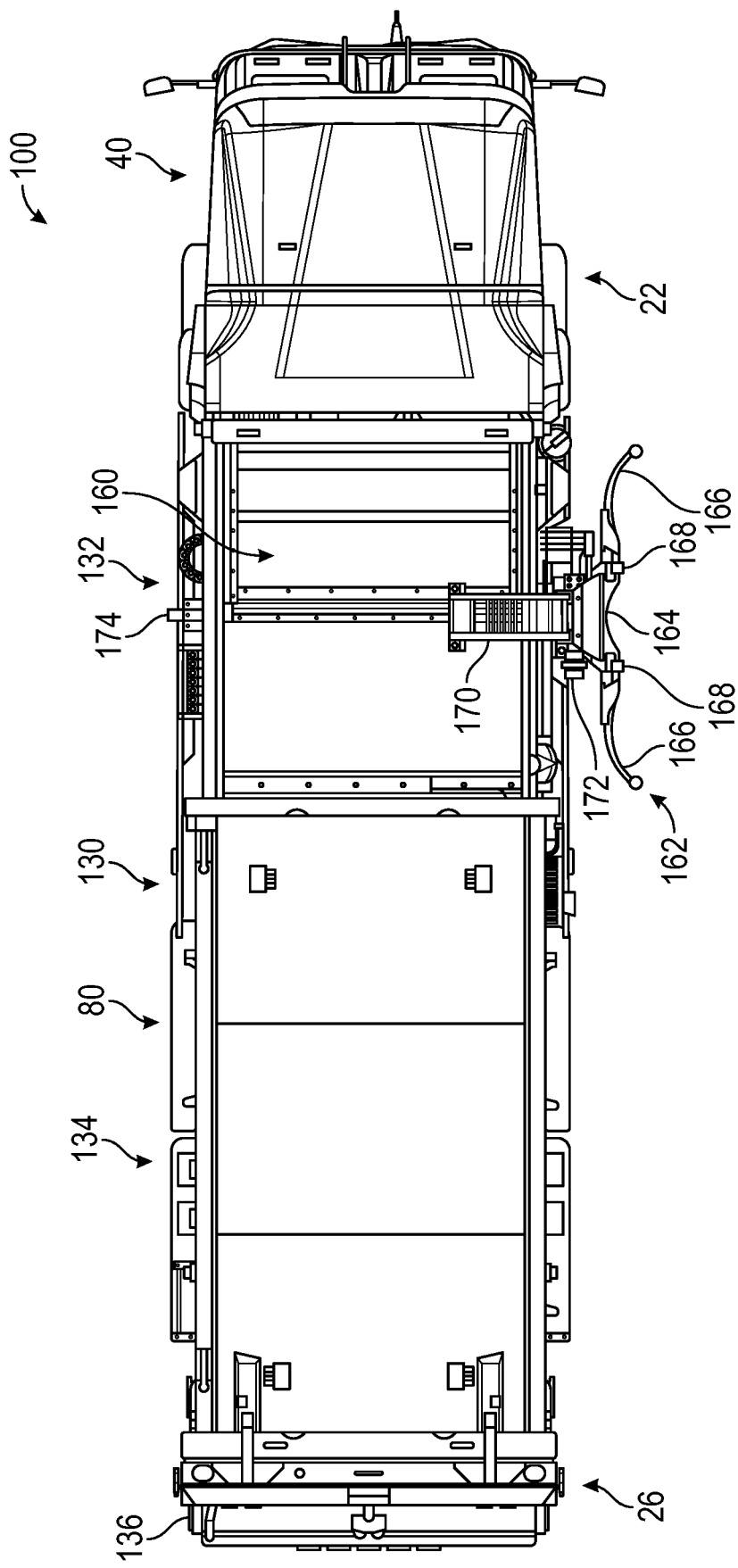
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms, shown as lift arms 142, and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
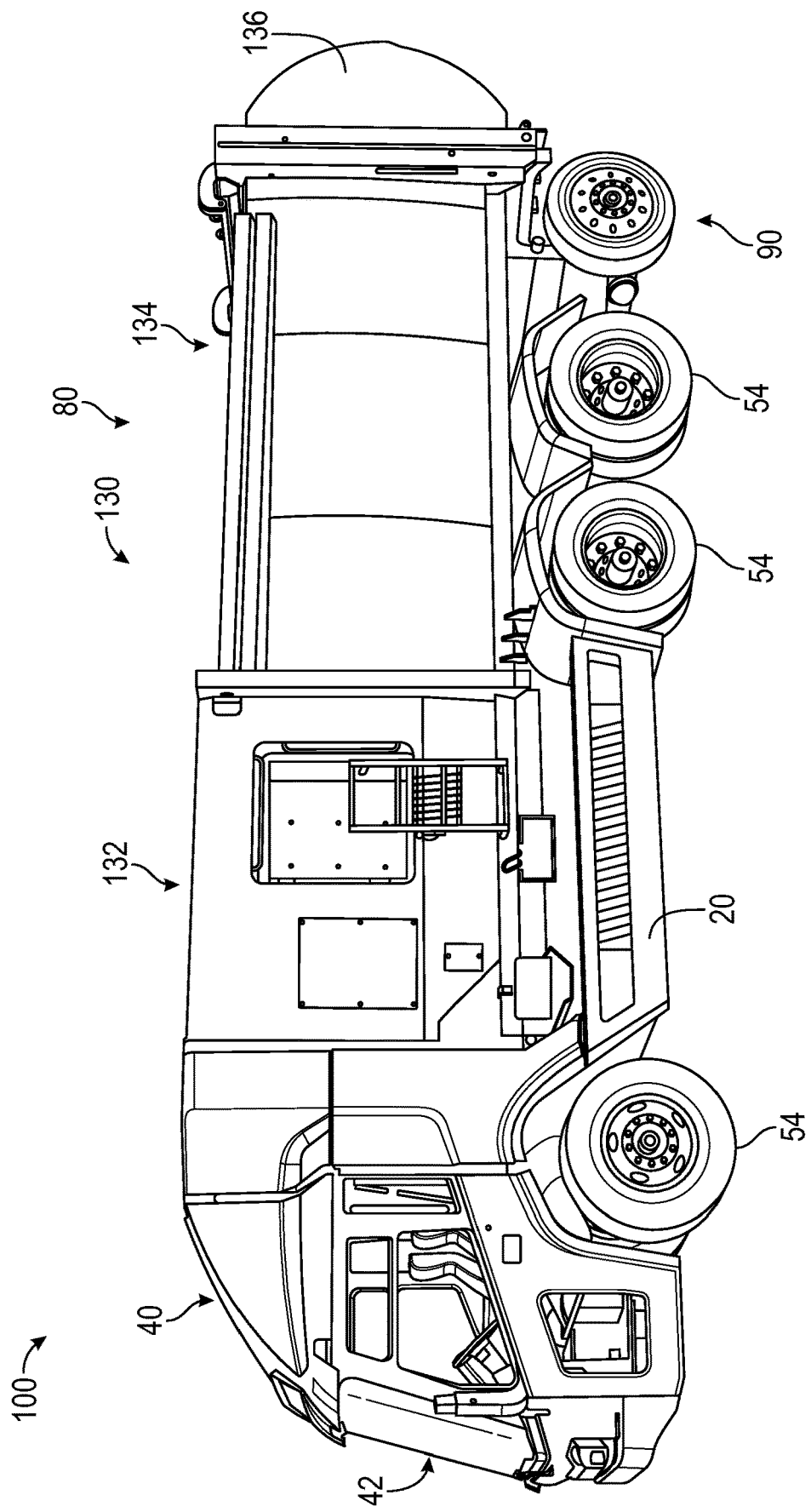
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
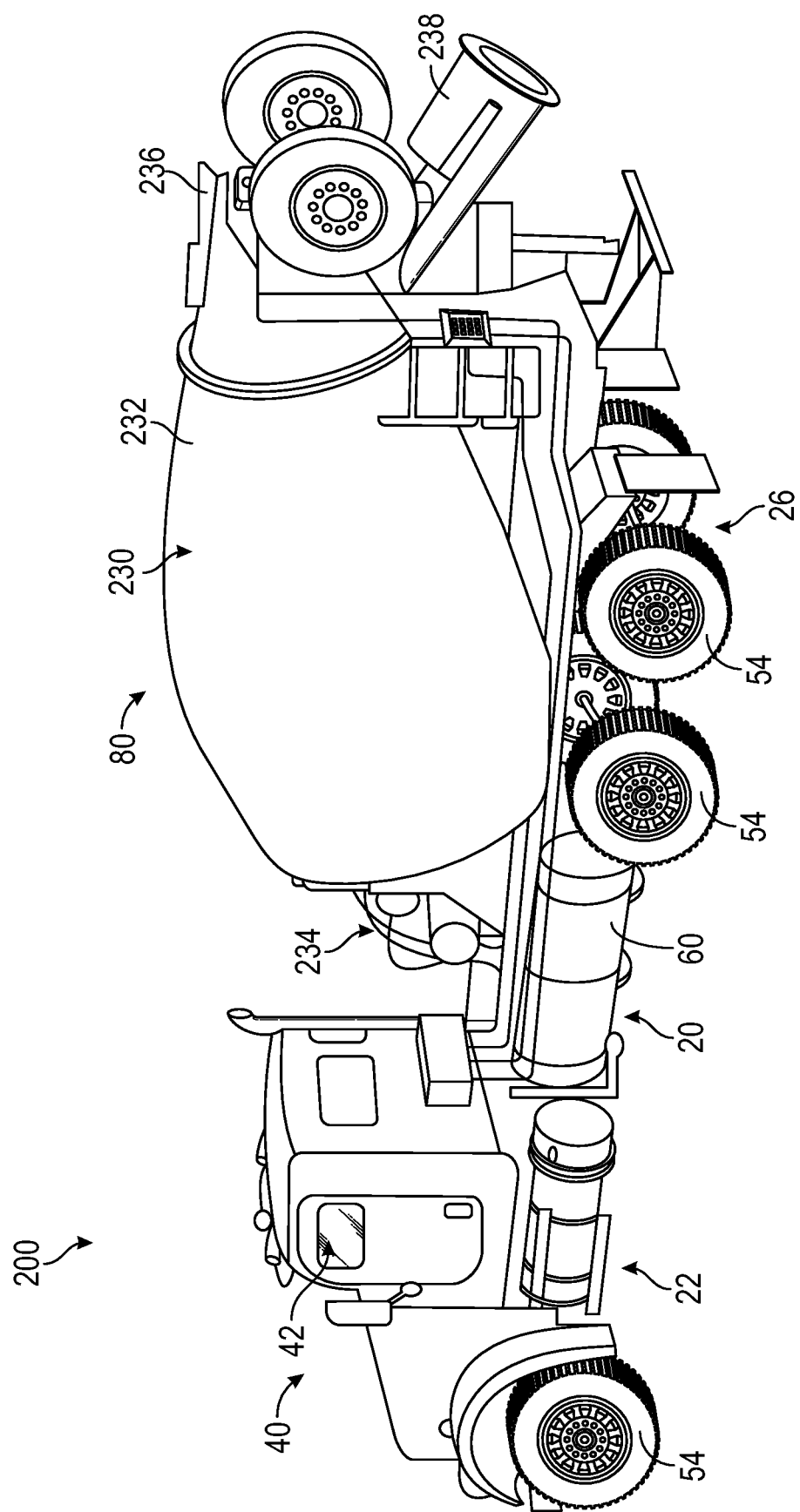
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
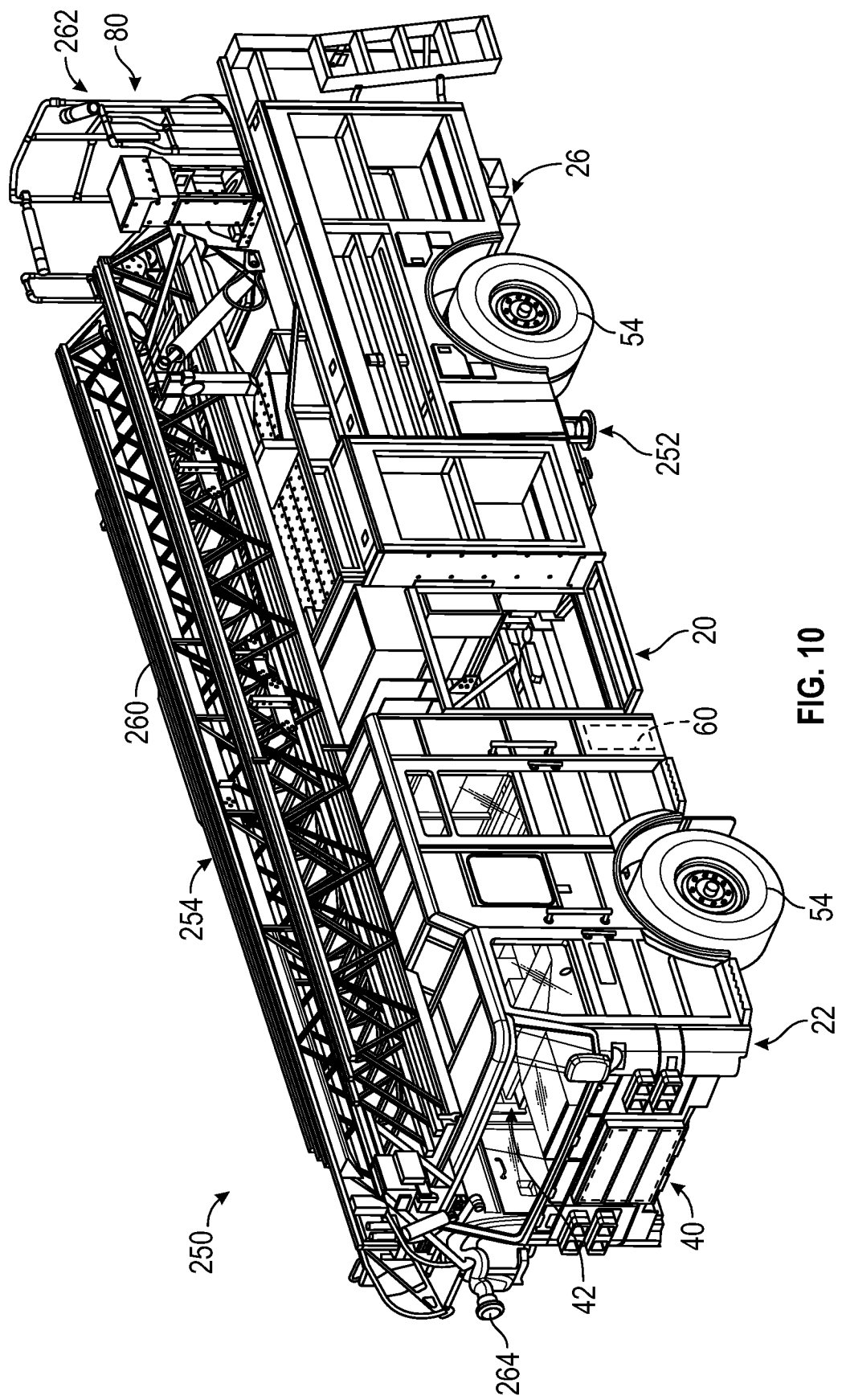
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
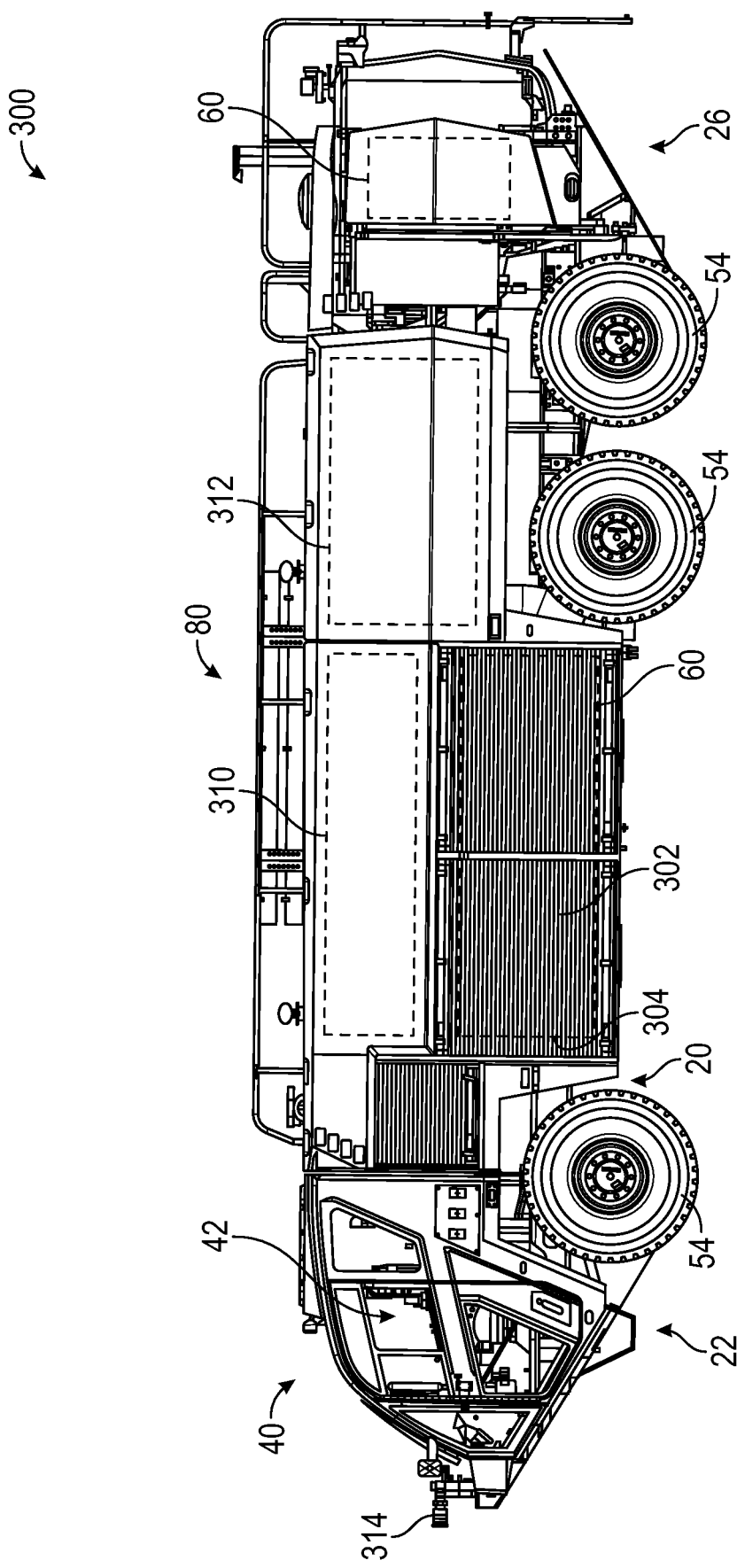
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
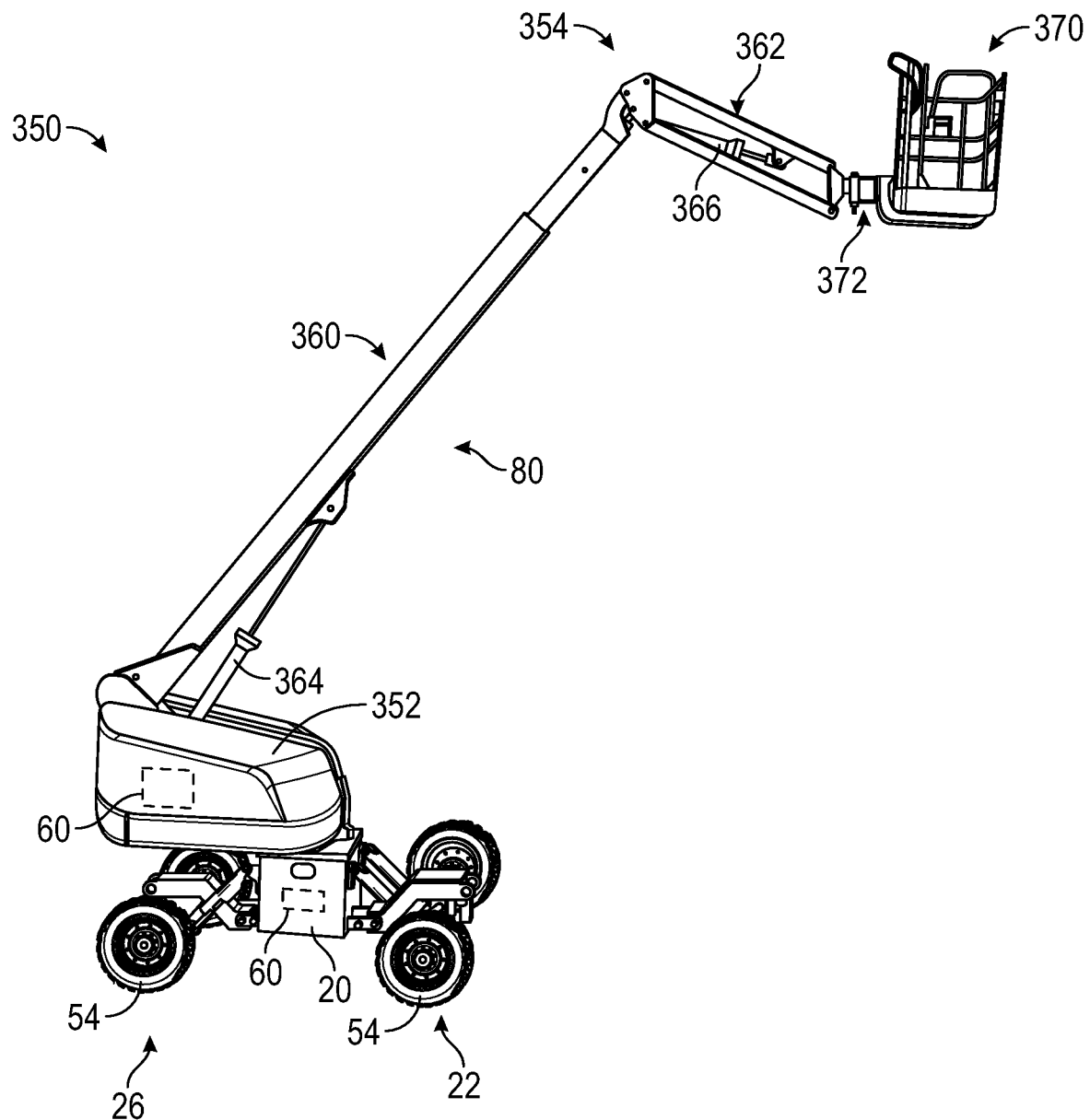
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
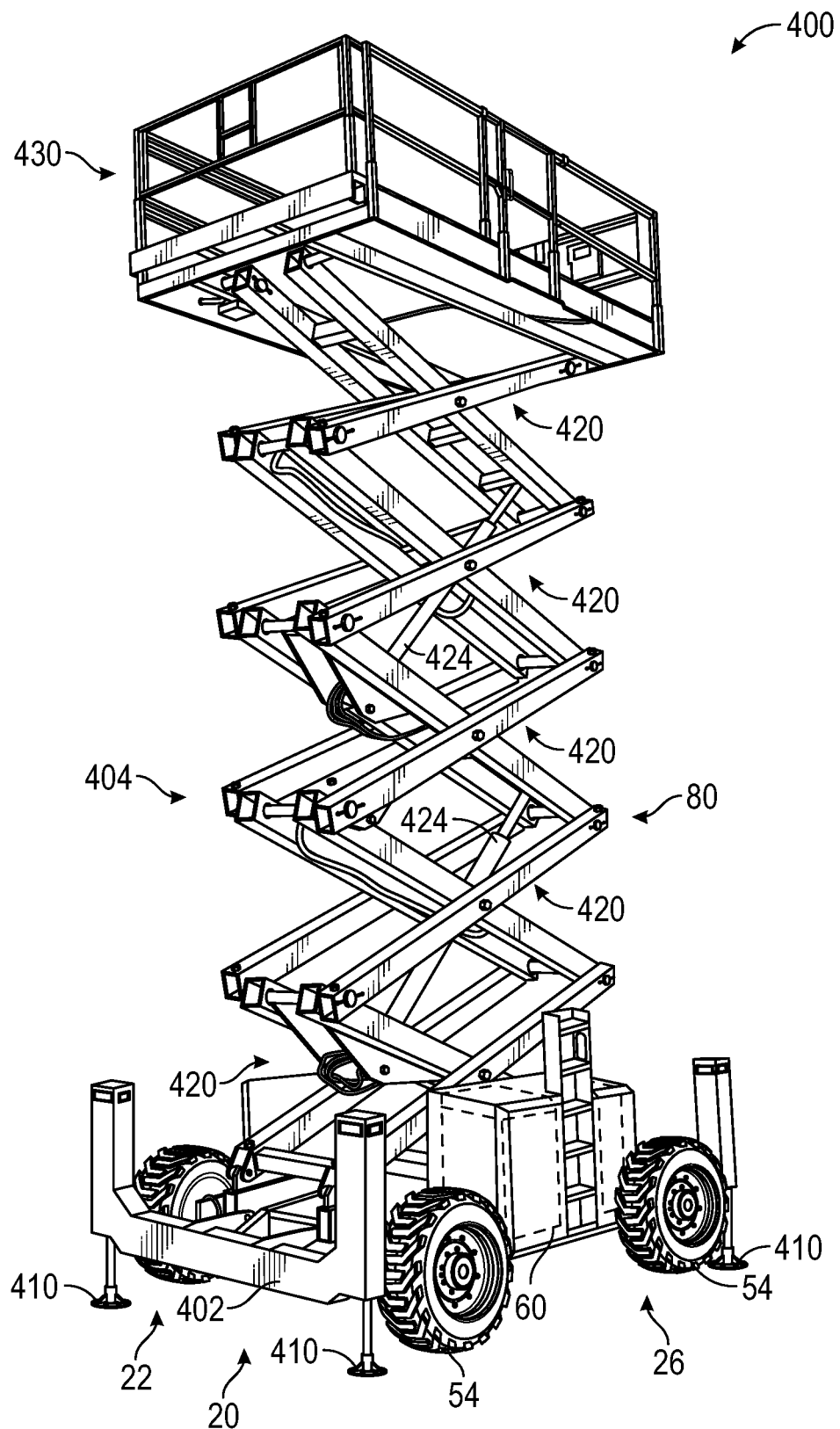
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Cab

Figure 14:
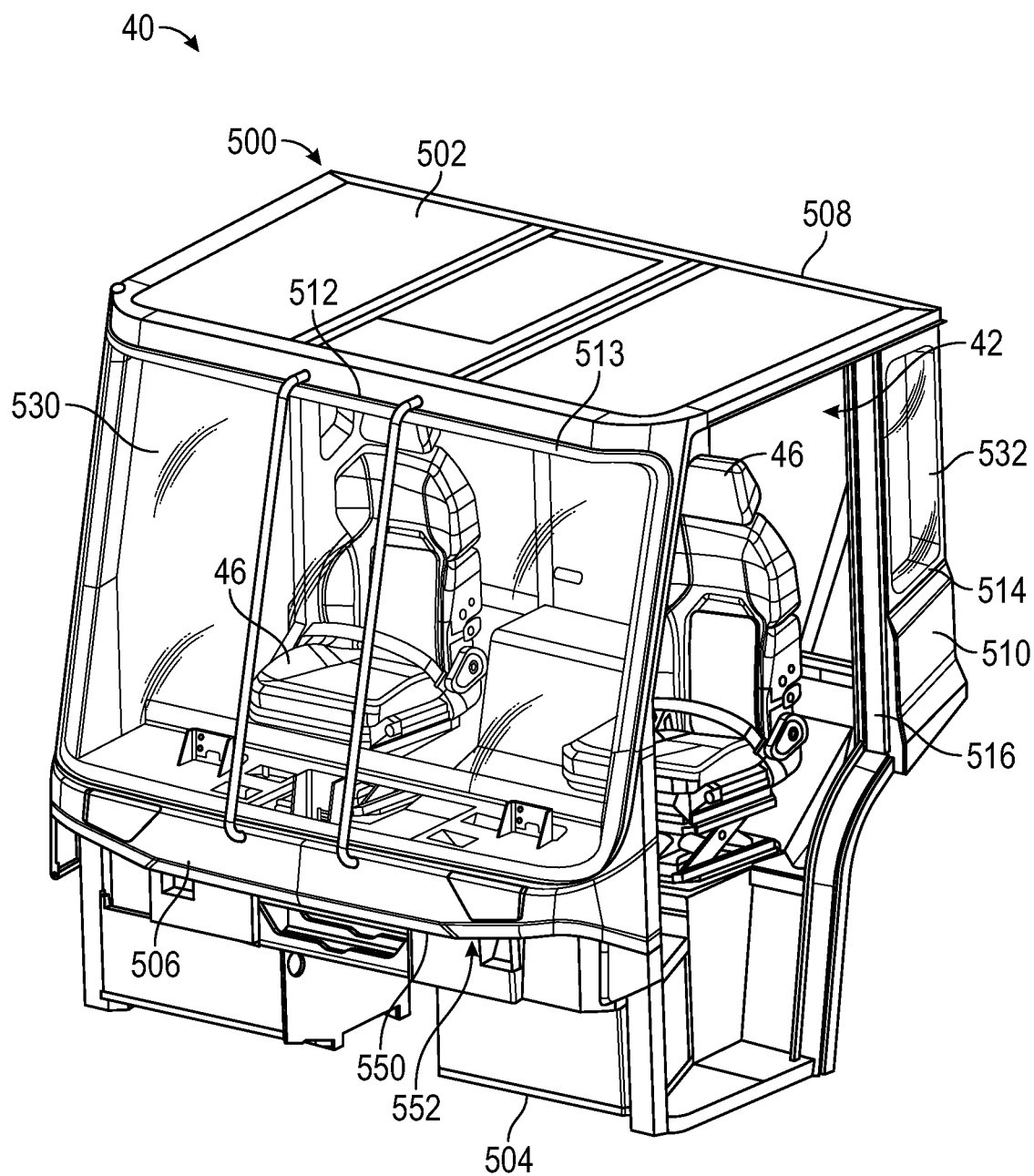
FIG. 14 is a perspective view of a cab of the vehicle of FIG. 1, according to an exemplary embodiment.
Figure 15:
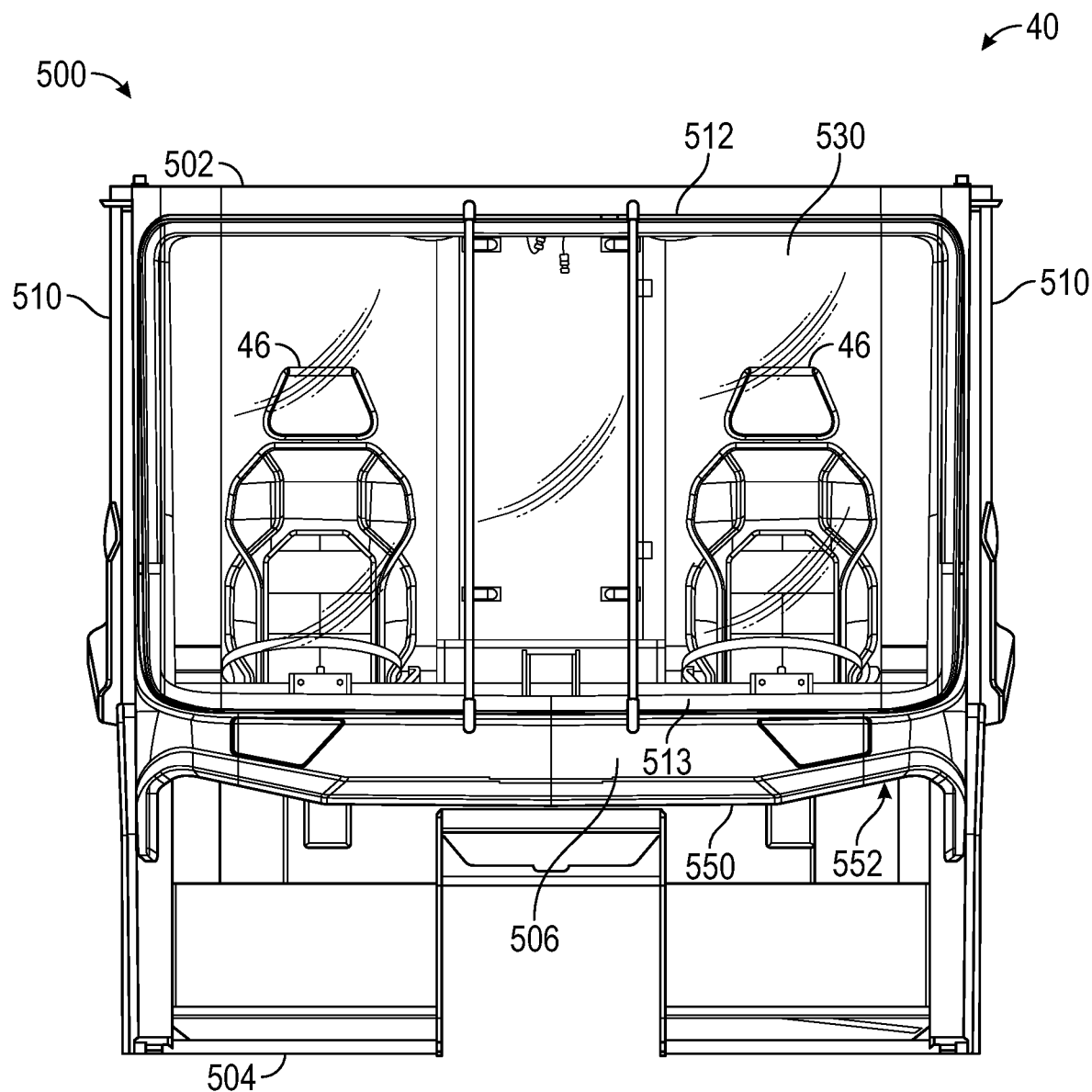
FIG. 15 is a front view of the cab of FIG. 14, according to an exemplary embodiment.
Figure 16:
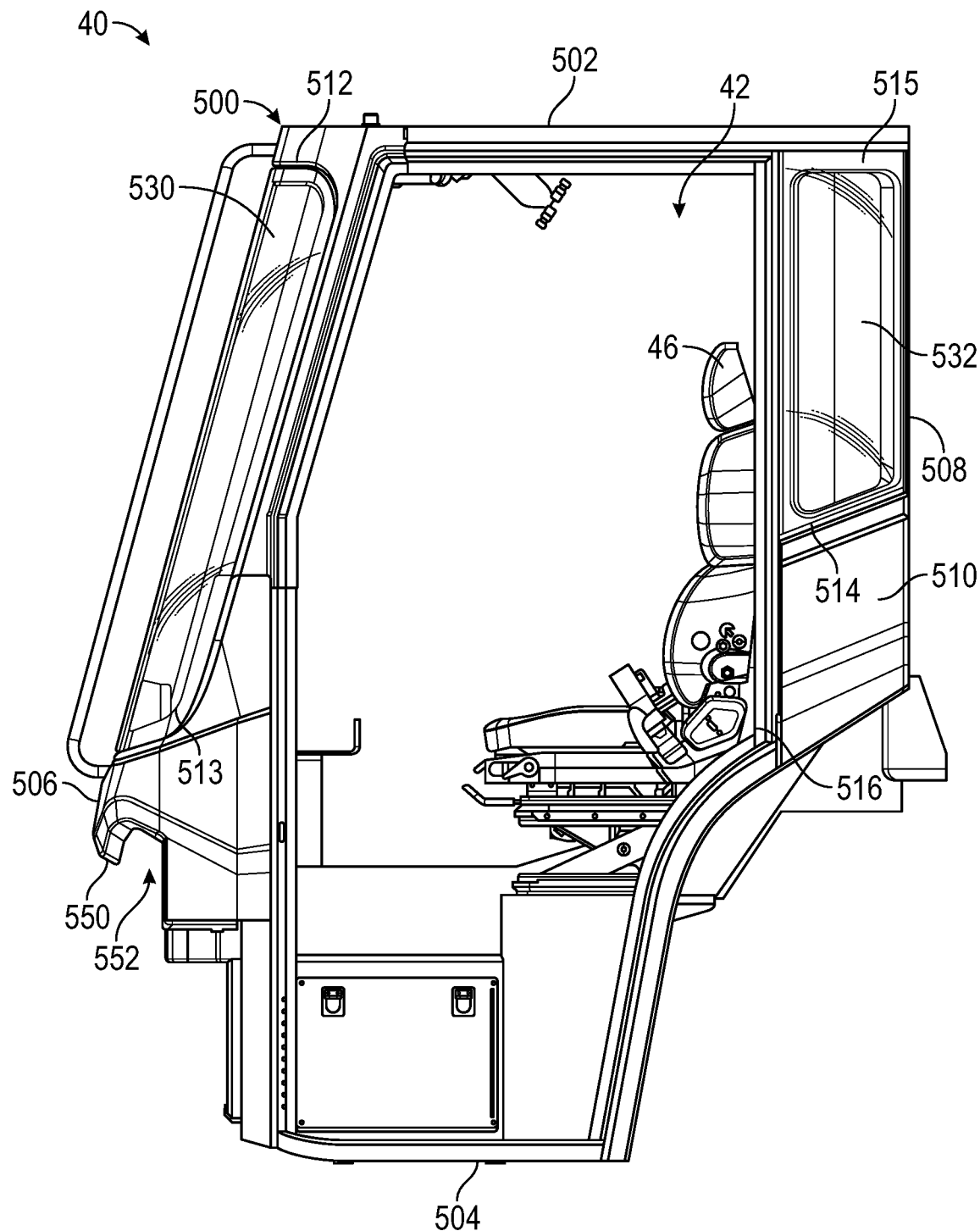
FIG. 16 is a side view of the cab of FIG. 14, according to an exemplary embodiment.

As shown in FIGS. 14-16, the cab 40 includes a cab structure, shown as cab body 500, having a top surface, shown as top wall 502, a bottom surface, shown as bottom wall 504, a front surface, shown as front wall 506, a rear surface, shown as rear wall 508, and opposing side surfaces, shown as sidewalls 510. The top wall 502, the bottom wall 504, the front wall 506, the rear wall 508, and the sidewalls 510 cooperatively form the cab body 500 and define the cab interior 42. According to the exemplary embodiment shown in FIGS. 14-16, the cab 40 is configured as a cab forward design where the front wall 506 is substantially vertical or flat and where the cab 40 is configured to be positioned forward of and at least partially above the front axle 50. As shown in FIGS. 14-16, the cab 40 includes a pair of seats, shown as seats 46, disposed within the cab interior 42. The seats 46 accommodate an operator and/or a passenger within the cab interior 42.

A. Window Arrangement

As shown in FIGS. 14-16, the front wall 506 and the sidewalls 510 cooperatively define a first cab opening, shown as windshield opening 512, that extends across the entirety of the front wall 506 and at least partially wraps onto/along the sidewalls 510 (e.g., along the A-pillars). The cab 40 includes a first transparent panel, shown as windshield 530, that is received within and by the windshield opening 512. According to the exemplary embodiment shown in FIGS. 14 and 15, the windshield 530 is a single, continuous panel that extends from and partially along a first sidewall 510, around a first corner of first sidewall 510, across the front wall 506, around a second corner of a second sidewall 510, and partially along the second sidewall 510 with no breaks or interruptions therebetween. According to an exemplary embodiment, the windshield 530 enhances occupant/operator visibility by eliminating any central supports typically used with such large windshields, as well as provides increased lateral visibility out of the front corners of the cab body 500 due to the wrap-around structure. As shown in FIGS. 14-16, the windshield opening 512 has a first recessed interface, shown as windshield ledge 513, extending inward along the peripheral edges thereof and that is recessed relative to the front wall 506 and the sidewalls 510. The periphery of the windshield 530 interfaces with and extends along the windshield ledge 513 such that the windshield 530 is substantially flush with the front wall 506 and the sidewalls 510. According to an exemplary embodiment, the periphery of the windshield 530 is bonded to the windshield ledge 513 (e.g., using urethane bonding), which is stronger and less likely to leak than typical windshield designs that use an H-gasket. In some embodiments, the periphery of the windshield 530 includes frit or another suitable coating to hide or otherwise at least partially conceal the bonding agent between the windshield 530 and the windshield ledge 513. According to an exemplary embodiment, a dashboard of the cab 40 (e.g., displays, gauge cluster, operator controls, etc.) is substantially lower than in currently available vehicles and/or the area thereof is reduced relative to currently available vehicles to improve/enhance operator visibility out of the windshield 530.

As shown in FIGS. 14 and 16, each of the sidewalls 510 defines a second cab opening, shown as rear corner window opening 514, positioned (i) along the rear corner of the sidewall 510 where the sidewall 510 and the rear wall 508 meet and (ii) rearward of the seats 46. The cab includes second transparent panels, shown as rear corner windows 532, that are received within and by the rear corner window openings 514. According to an exemplary embodiment, the rear corner windows 532 enhance occupant/operator visibility by providing a line of sight out of the rear corners of the cab body 500 that would typically otherwise be obscured by solid, non-transparent walls. As shown in FIGS. 14 and 16, the rear corner window openings 514 have a second recessed interface, shown as corner window ledge 515, extending inward along the peripheral edges thereof and that is recessed relative to the sidewalls 510. The peripheries of the rear corner windows 532 interface with and extend along the corner window ledges 515 such that the rear corner windows 532 are substantially flush with the sidewalls 510. According to an exemplary embodiment, the periphery of the rear corner windows 532 is bonded to the corner window ledge 515 (e.g., using a urethane bonding). In some embodiments, the peripheries of the rear corner window 532 include frit or another suitable coating to hide or otherwise at least partially conceal the bonding agent between the rear corner windows 532 and the rear corner ledges 515.

Figure 17:
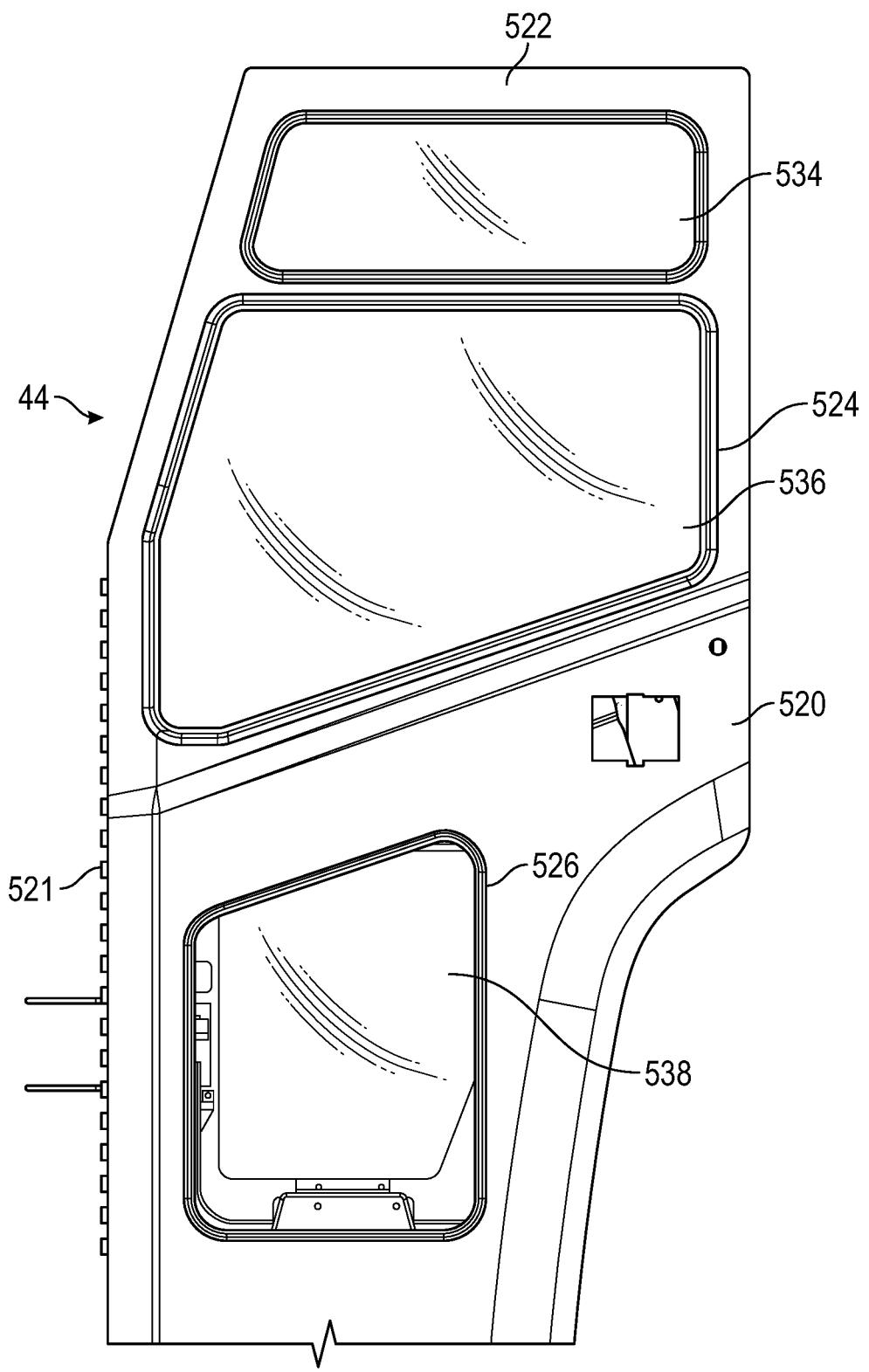
FIG. 17 is a side view of a door of the cab of FIG. 14, according to an exemplary embodiment.

As shown in FIGS. 14 and 16, each of the sidewalls 510 defines a third cab opening, shown as doorway 516, between the rear corner window opening 514 and the windshield opening 512, and to which one of the doors 44 extends across. As shown in FIG. 17, the door 44 includes a panel, shown as door panel 520, having a pivotable coupler, shown as hinge 521, disposed along a front edge thereof. According to an exemplary embodiment, the hinge 521 is configured to pivotably couple the door panel 520 to the sidewall 510 such that the door extends across the doorway 516 and provides selective access to the cab interior 42. As shown in FIG. 17, the door panel 520 defines a first door opening, shown as overhead window opening 522, positioned proximate an upper end of the door panel 520; a second door opening, shown as main side window opening 524, positioned below the overhead window opening 522; and a third door opening, shown as peep window opening 526, positioned beneath the main side window opening 524 and positioned proximate a bottom end of the door panel 520.

Figure 18:
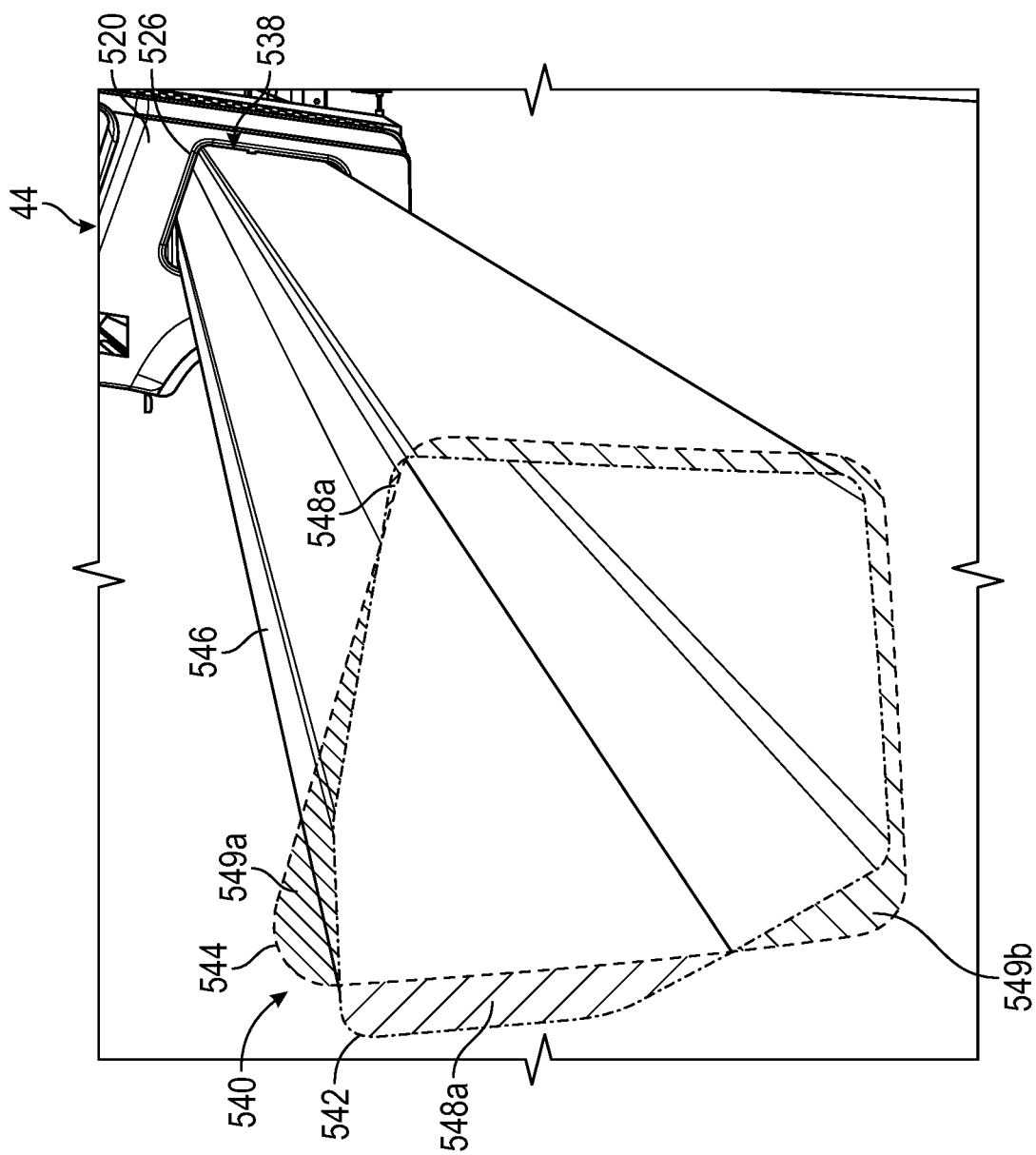
FIG. 18 is a perspective view of projections of an interior windowpane and an exterior windowpane of a peep window of the door of FIG. 17, according to an exemplary embodiment.

As shown in FIGS. 17 and 18, each of the doors 44 includes a third transparent panel, shown as overhead window 534, received within and by the overhead window opening 522; a fourth transparent panel, shown as main side window 536, received within and by the main side window opening 524; and a fifth transparent panel, shown as peep window 538, received within and by the peep window opening 526. According to the exemplary embodiment shown in FIG. 17, the overhead windows 534 extend along a substantial majority (almost the entirety) of the width of the door panel 520. According to an exemplary embodiment, the overhead windows 534 enhance occupant/operator visibility by providing a line of sight out of the upper portion of the doors 44 that would typically otherwise be obscured by a solid, non-transparent portion of the doors 44. Therefore, the occupant/operator is able to see objects above the cab 40 more easily such as low clearance areas, trees, power lines, and the like. According to an exemplary embodiment, the vehicle 10, when a fully electric vehicle, does not include an engine tunnel running through the cab 40 and, therefore, the peep window 538 on each side of the vehicle 10 is clearly visible from the seat 46.

As shown in FIG. 18, each of the peep windows 538 has a multi-pane structure, shown as double-pane structure 540, such that the peep windows 538 include a first windowpane, shown as interior windowpane 542, and a second windowpane, shown as exterior windowpane 544. According to an exemplary embodiment, (i) one or more portions of the interior windowpane 542 and the exterior windowpane 544 are at least partially offset vertically and/or horizontally from each other and/or (ii) the interior windowpane 542 and the exterior windowpane 544 have different or varied shapes relative to one another. As shown in FIG. 18, a projection 546 shows the overlapping area between the interior windowpane 542 and the exterior windowpane 544, while (i) non-overlapping areas 548a and 548b show portions of the interior windowpane 542 that are not overlapped by the exterior windowpane 544 and (ii) non-overlapping areas 549a and 549b show portions of the exterior windowpane 544 that are not overlapped by the interior windowpane 542.

Specifically, as shown in FIG. 18, (i) the non-overlapping area 548a of the interior windowpane 542 is horizontally offset from the exterior windowpane 544 (e.g., at least a portion of the rear edge of the interior windowpane 542 is positioned further rearward than at least a portion of the rear edge of the exterior windowpane 544), (ii) the non-overlapping area 548b of the interior windowpane 542 is vertically offset from the exterior windowpane 544 (e.g., at least a portion of the upper edge of the interior windowpane 542 is positioned vertically above at least a portion of the upper edge of the exterior windowpane 544), (iii) the non-overlapping area 549a of the exterior windowpane 544 is vertically offset from the interior windowpane 542 (e.g., at least a portion of the upper edge of the exterior windowpane 544 is positioned vertically above at least a portion of the upper edge of the interior windowpane 542), and (iv) the non-overlapping area 549b of the exterior windowpane 544 is vertically and horizontally offset from the interior windowpane 542 (e.g., at least a portion of the lower edge of the exterior windowpane 544 is positioned vertically below at least a portion of the lower edge of the interior windowpane 542, at least a portion of the rear edge of the exterior windowpane 544 is positioned further rearward than at least a portion of the rear edge of the interior windowpane 542, and/or at least a portion of the front edge of the exterior windowpane 544 is positioned further forward than at least a portion of the front edge of the interior windowpane 542).

According to an exemplary embodiment, the various offsets between the interior windowpane 542 and the exterior windowpane 544 enhances occupant/operator visibility by maximizing the visible area out of the lower portion of the doors 44. The peep windows 538 provide an enhanced line of sight out of the lower portion of the doors 44 relative to aligned double-pane peep windows. Therefore, the occupant/operator is able to see objects below and adjacent the cab 40 more easily such as adjacent cars, refuse containers, pedestrians, nearby obstacles, and the like (e.g., making turning maneuvers and maneuvering in tight spaces easier).

B. Windshield Wiper Arrangement

Figure 19:
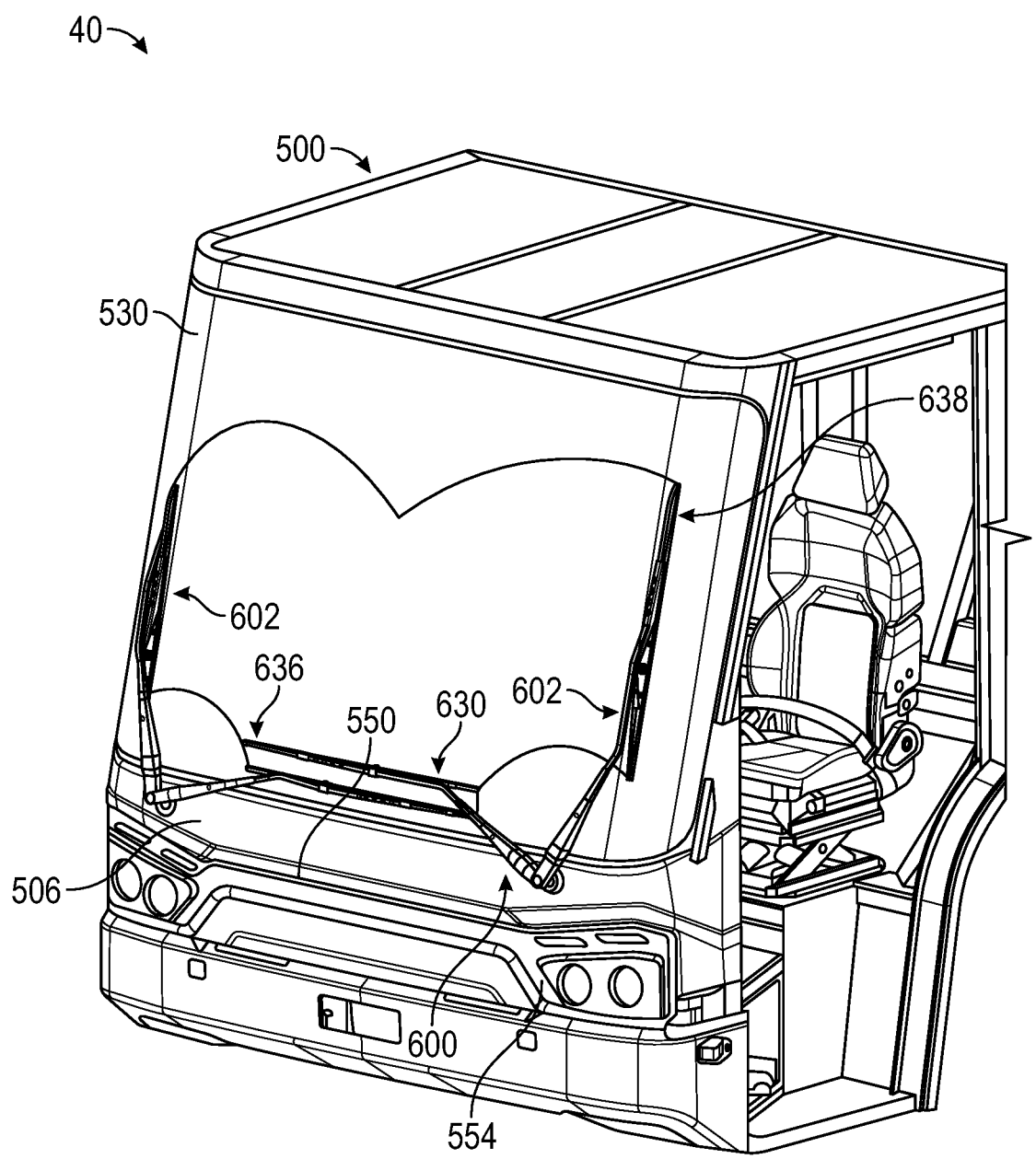
FIG. 19 is a perspective view of the cab of FIG. 14 including a windshield wiper system, according to an exemplary embodiment.
Figure 20:
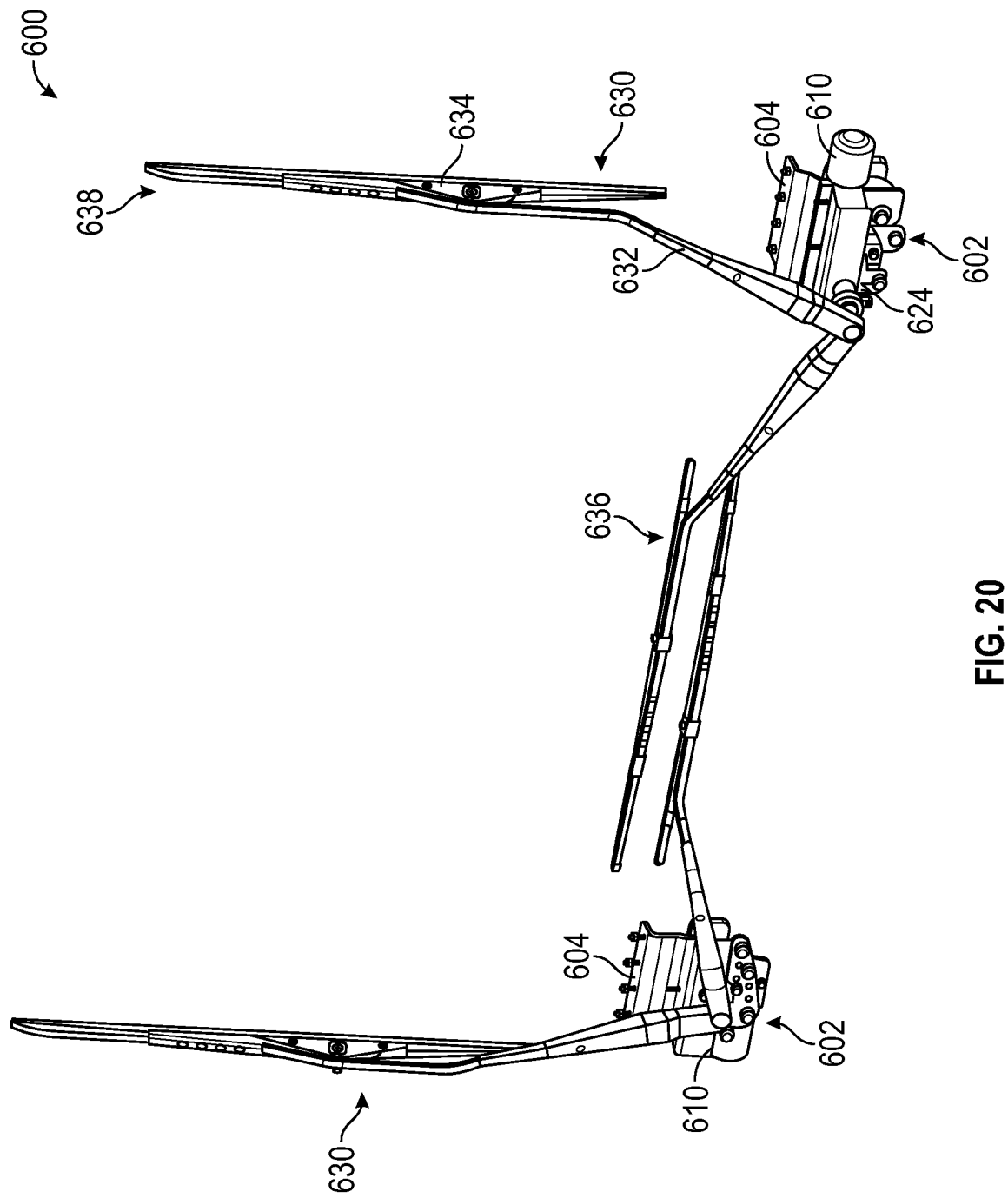
FIG. 20 is a detailed perspective view of the windshield wiper system of FIG. 19 including actuator assemblies and wiper assemblies, according to an exemplary embodiment.
Figure 21:
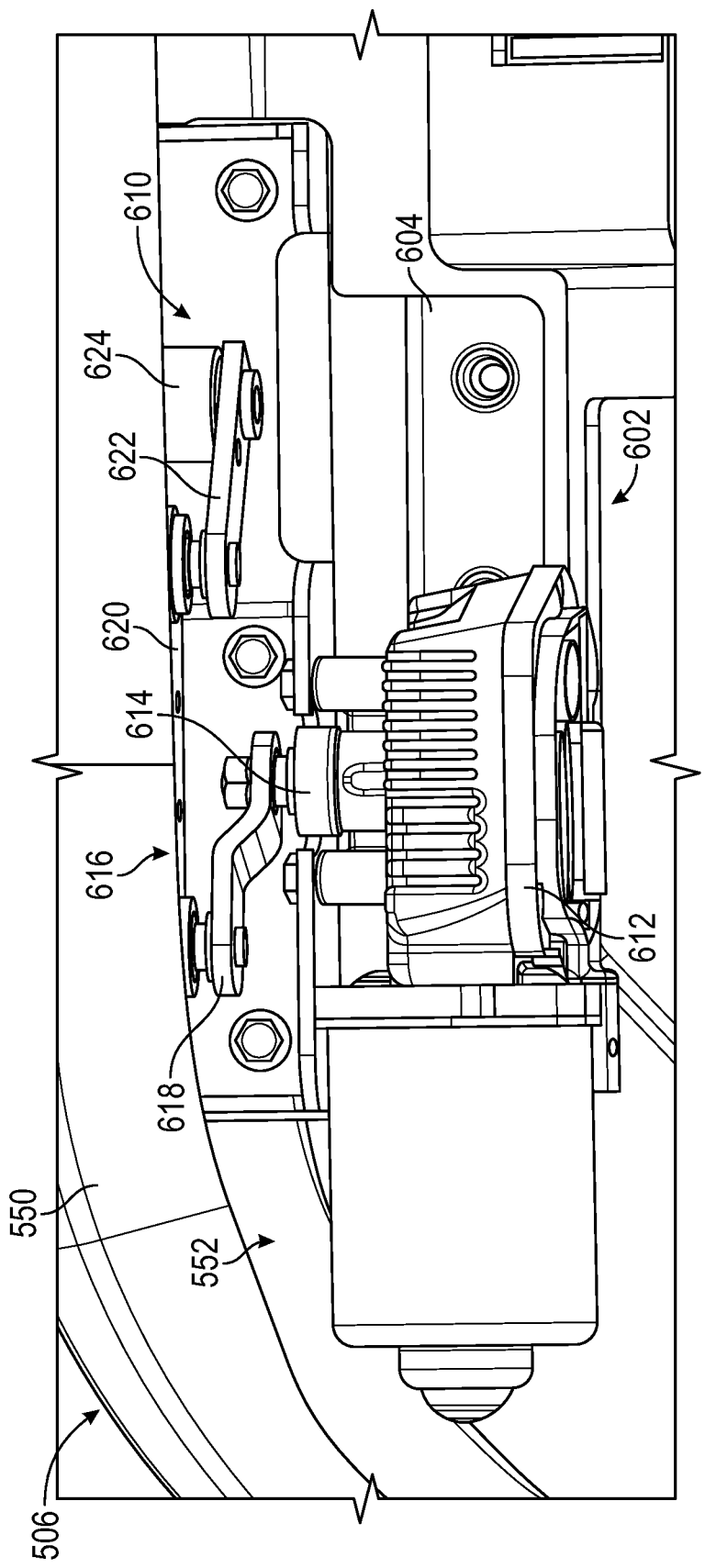
FIG. 21 is a detailed view of one of the actuator assemblies of FIG. 20, according to an exemplary embodiment.

As shown in FIGS. 19-21, the cab 40 includes a wiper system, shown as windshield wiper system 600, including a pair of windshield wiper assemblies, shown as windshield wiper assemblies 602. Each of the windshield wiper assemblies 602 includes a bracket, shown as wiper mounting bracket 604, an actuator assembly, shown as wiper actuator assembly 610, and a wiper assembly, shown as wiper assembly 630. According to an exemplary embodiment, the windshield wiper assemblies 602 are configured as sprague radial-mounted wiper assemblies.

As shown in FIGS. 14-16 and 19, the front wall 506 of the cab body 500 defines an interface, shown as front lip 550, positioned at a lower end thereof (e.g., beneath the windshield opening 512). As shown in FIGS. 14-16, a recess, shown as front recess 552, is defined underneath and behind the front lip 550. As shown in FIG. 19, the cab 40 includes a bezel, shown a front bezel 554, that is received by the front recess 552 and engages with the front lip 550 to couple the front bezel 554 to the cab body 500. According to an exemplary embodiment, the front bezel 554 facilitates mounting headlights to the cab body 500. As shown in FIG. 21, the wiper actuator assembly 610 is positioned within the front recess 552 and tucked behind the front lip 550 and the front bezel 554 where the wiper mounting bracket 604 couples the wiper actuator assembly 610 and, thereby, the windshield wiper assembly 602 to the cab body 500. The wiper actuator assembly 610 includes an actuator, shown as wiper motor 612, coupled directly to the wiper mounting bracket 604 and has an output, shown as actuator output 614; a linkage assembly, shown as wiper linkage assembly 616, including a first linkage, shown as linkage 618, coupled to the actuator output 614, a second linkage, shown as linkage 620, coupled to the linkage 618, and a third linkage, shown as linkage 622, coupled to the linkage 620; and a driving shaft, shown as wiper driver 624, coupled to the linkage 622 and that extends through the front wall 506 (between the front lip 550 and the windshield 530) and engages with the wiper assembly 630.

As shown in FIGS. 19 and 20, each of the wiper assemblies 630 includes an arm, shown as wiper arm 632, having a first end coupled to the wiper driver 624 and an opposing second end coupled to a blade, shown as wiper blade 634. According to the exemplary embodiment shown in FIGS. 19 and 20, the wiper motors 612 are configured to drive the wiper linkage assemblies 616 and, thereby, the wiper drivers 624 to pivot the wiper assemblies 630 between a first position, shown as stowed position 636, proximate the bottom of the windshield 530 and a second position, shown as end of stroke position 638, proximate the sides of the windshield 530. When in the stowed position 636, the wiper blades 634 overlap each other and are vertically aligned but slightly offset from each other, and the wiper blades 634 are substantially hidden from view, which thereby enhances the occupant/operator's line of sight out of the lower portion of the windshield 530.

C. Visibility

Figure 22:
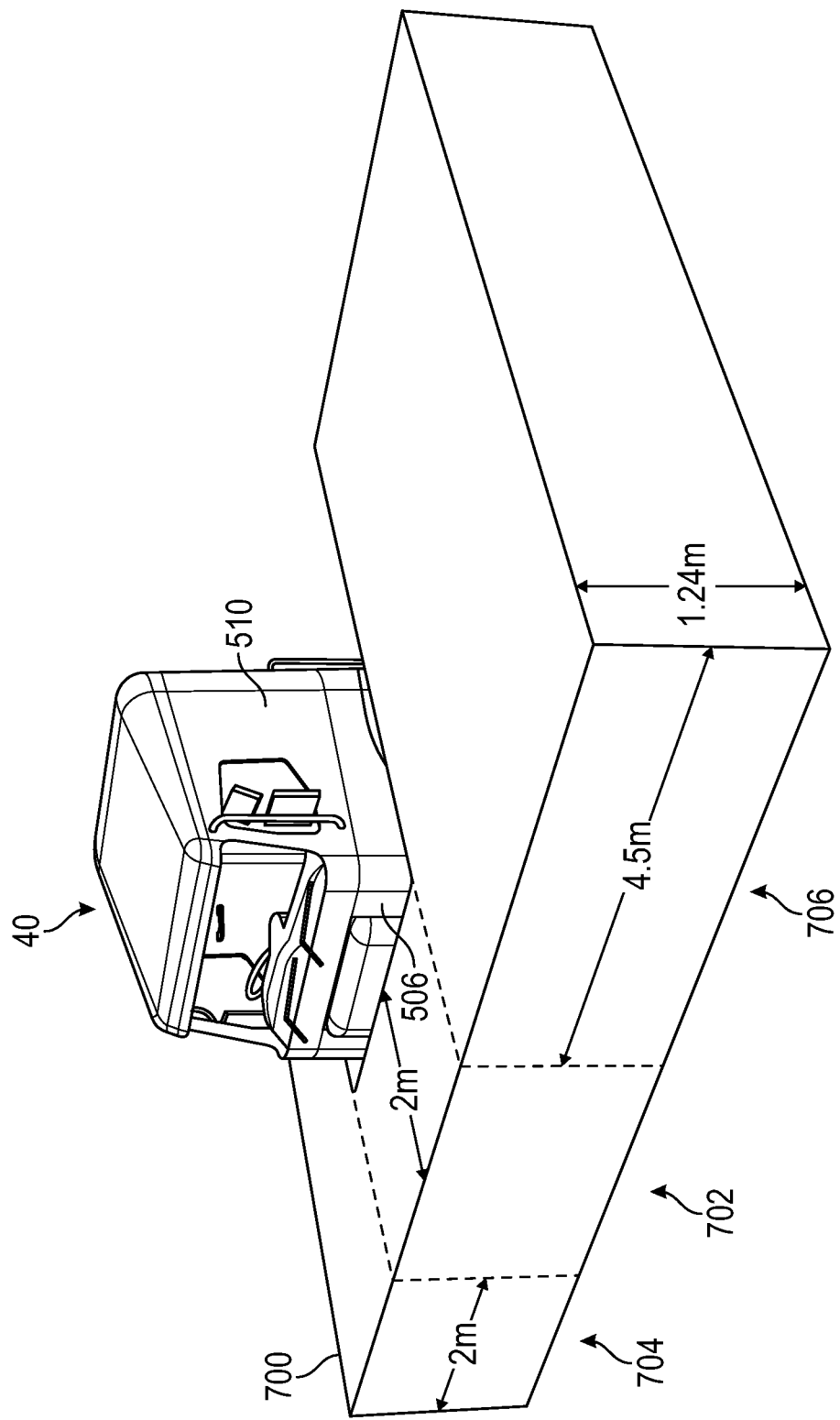
FIG. 22 is a perspective view of the cab of FIG. 14 and a visibility assessment region surrounding the cab, according to an exemplary embodiment.
Figure 23:
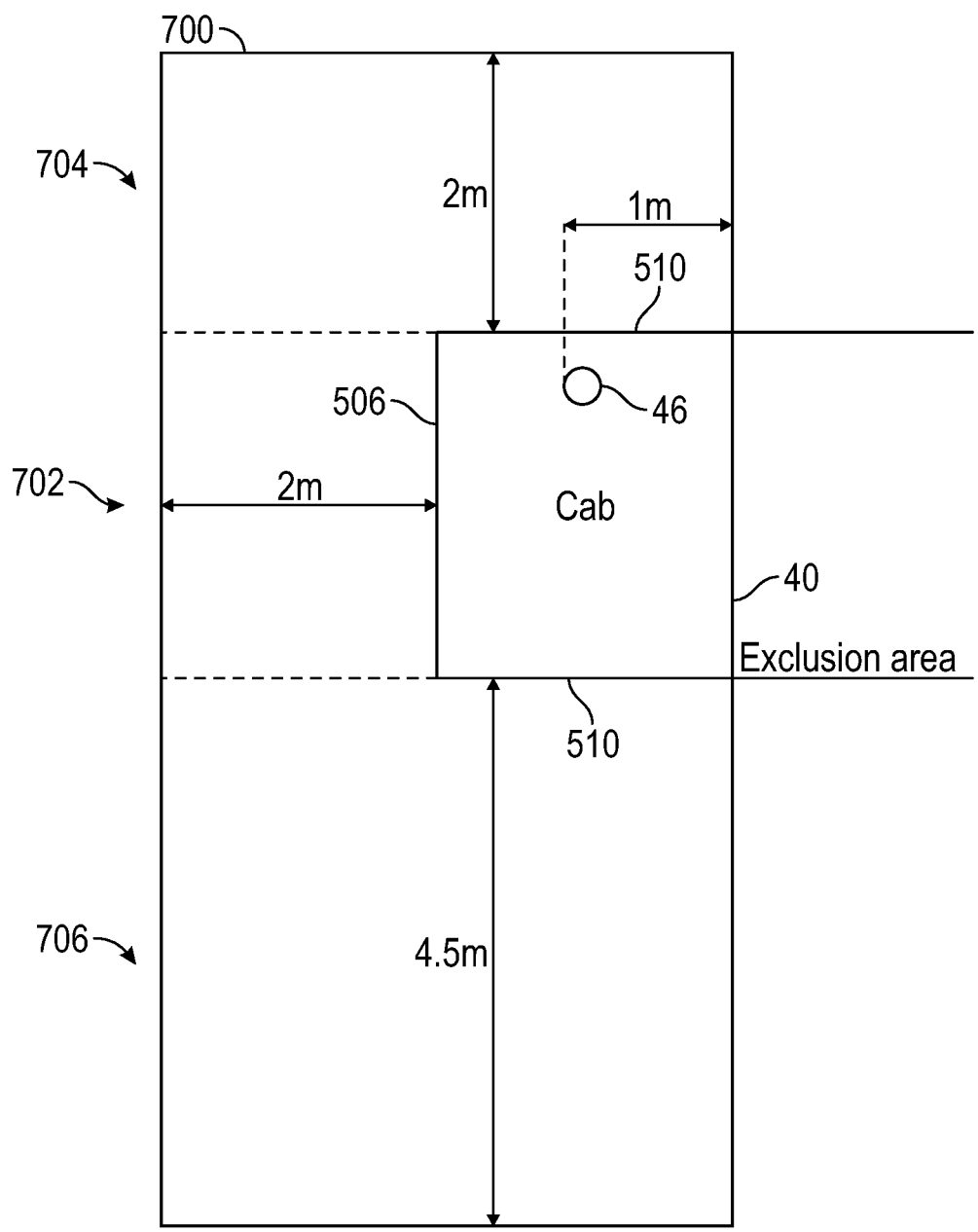
FIG. 23 is a schematic top view of the cab and the visibility assessment region of FIG. 22, according to an exemplary embodiment.

As shown in FIGS. 22 and 23, an assessment region, shown as visibility assessment region 700, is defined about the cab 40. Specifically, the visibility assessment region 700 includes (i) a first sub-region, shown as central zone 702, (a) that extends 2 meters forward from the front wall 506 and (b) that extends laterally across the width of the cab 40, (ii) a second sub-region, shown as driver side zone 704, (a) that extends 2 meters outward from the driver side sidewall 510 (i.e., the sidewall 510 closest to the seat 46 for the driver), (b) that extends 2 meters forward from the front wall 506, and (c) that extends 1 meter rearward of the seat 46 for the driver (e.g., when the seat 46 is in a position to accommodate an operator in the 5th percentile of height for women or about 4 feet 11 inches), and (iii) a third sub-region, shown as passenger side zone 706, (a) that extends 4.5 meters outward from the passenger side sidewall 510 (i.e., the sidewall 510 furthest to the seat 46 for the driver), (b) that extends 2 meters forward from the front wall 506, and (c) that extends 1 meter rearward of the seat 46 for the driver. As shown in FIG. 22, the visibility assessment region 700 has a height of about 1.24 meters (i.e., a height of 48.85 inches, which is the 5th percentile female shoulder height).

Figure 24:
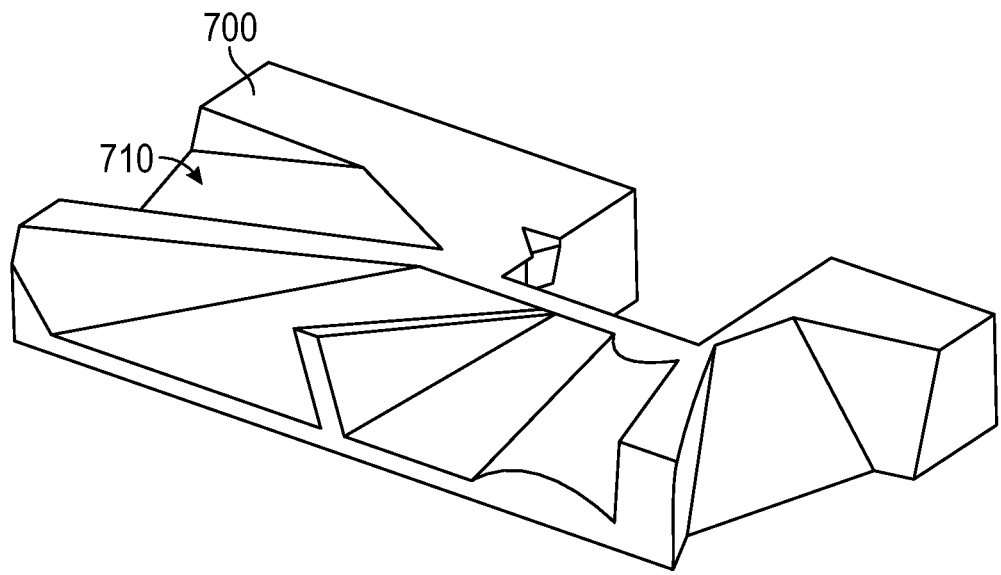
FIG. 24 is a perspective view of the visibility assessment region of FIG. 22 showing operator visibility from a traditional cab.
Figure 25:
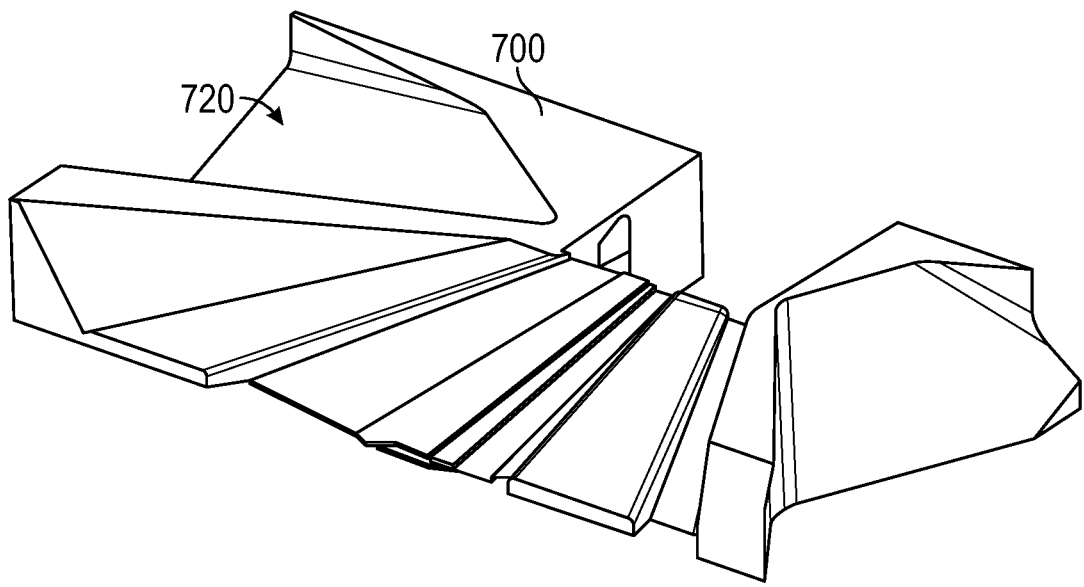
FIG. 25 is a perspective view of the visibility assessment region of FIG. 22 showing operator visibility from the cab of FIG. 14, according to an exemplary embodiment.
Figure 26:
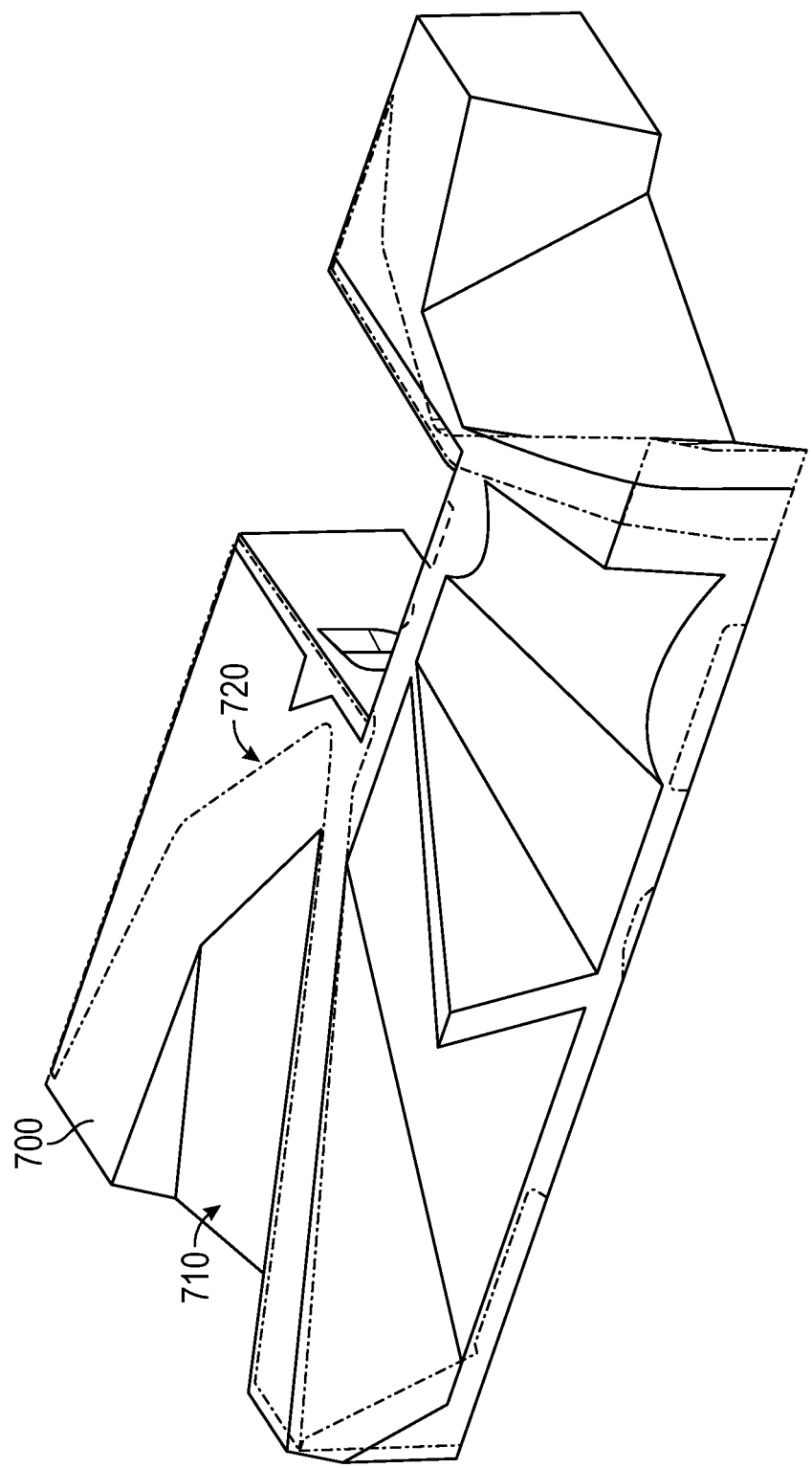
FIG. 26 is a perspective view of the visibility assessment region of FIG. 22 showing the operator visibility from FIGS. 24 and 25 overlaid with one another, according to an exemplary embodiment.

As shown in FIG. 24, a first visibility profile 710 was determined for a conventional refuse truck currently available in the marketplace that boasts "superior visibility." Specifically, the first visibility profile 710 for the visibility assessment region 700 was determined from a driver seat within the cab of the conventional refuse truck (e.g., from an ocular point of an operator in the 5th percentile of height for women). As shown in FIG. 25, a second visibility profile 720 was determined for the vehicle 10. Specifically, the second visibility profile 720 for the visibility assessment region 700 was determined from the seat 46 within the cab 40 (e.g., from an ocular point of an operator in the 5th percentile of height for women). As shown in FIG. 26, the first visibility profile 710 (shown in solid lines) and the second visibility profile 720 (shown in dash-dot lines) are overlaid with one another within the visibility assessment region 700, which shows the enhanced visibility from the cab 40 of the vehicle 10 relative to other refuse vehicles available today. Specifically, the first visibility profile 710 provided a visibility block of about 27.05 cubic meters ($m^3$), while the second visibility profile 720 provided a lesser and improved visibility block. In various embodiments, the visibility block provided by the second visibility profile 720 is less than 27 $m^3$ (e.g., less than 26 $m^3$, less than 25 $m^3$, less than 24 $m^3$, less than 23 $m^3$, less than 22 $m^3$, etc.) and greater than 20 $m^3$. According to an exemplary embodiment, the second visibility profile 720 provides a visibility block of about 21.10 $m^3$ (i.e., about a 22% improvement in visibility). The enhanced visibility from the cab 40 is provided at least partially by the design, arrangement, and positioning of the windshield 530 (e.g., the lack of any central window divider or split line, edges that curve onto the sidewalls 510, etc.), the rear corner windows 532, the overhead windows 534, the main side windows 536, the peep windows 538 (e.g., the offsets of the interior windowpane 542 and the exterior windowpane 544), the windshield wiper system 600, the seats 46, and the low profile dashboard.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A cab for a refuse vehicle, the cab comprising:
   a cab body defining a first door opening and a second door opening;
   a first door positioned over the first door opening; and
   a second door positioned over the second door opening;
   wherein each of the first door and the second door includes:
      a door panel; and
      a peep window positioned proximate a lower end of the door panel, the peep window including an interior windowpane and exterior windowpane, wherein portions of the interior windowpane and the exterior windowpane are vertically offset and horizontally offset.

2. The cab of claim 1, wherein each of the first door and the second door includes:
   an overhead window positioned proximate an upper end of the door panel; and
   a main window positioned beneath the overhead window.

3. The cab of claim 1, wherein the interior windowpane and the exterior windowpane have different shapes relative to one another.

4. The cab of claim 1, wherein at least a portion of a rear edge of the interior windowpane is positioned further rearward than at least a portion of the rear edge of the exterior windowpane.

5. The cab of claim 1, wherein at least a portion of an upper edge of the interior windowpane is positioned vertically above at least a portion of the upper edge of the exterior windowpane.

6. The cab of claim 1, wherein at least a portion of an upper edge of the exterior windowpane is positioned vertically above at least a portion of the upper edge of the interior windowpane.

7. The cab of claim 1, wherein at least a portion of a lower edge of the exterior windowpane is positioned vertically below at least a portion of the lower edge of the interior windowpane, at least a portion of a rear edge of the exterior windowpane is positioned further rearward than at least a portion of the rear edge of the interior windowpane, and at least a portion of a front edge of the exterior windowpane is positioned further forward than at least a portion of the front edge of the interior windowpane.

8. The cab of claim 1, wherein the cab body includes:
   a front wall;
   a rear wall;
   a first sidewall extending between first ends of the front wall and the rear wall; and
   a second sidewall extending between opposing second ends of the front wall and the rear wall.

9. The cab of claim 8, wherein a first front corner is defined between the front wall and the first sidewall, wherein a second front corner is defined between the front wall and the second sidewall, and wherein at least the front wall, the first front corner, and the second front corner cooperatively define a windshield opening, further comprising a windshield received by the windshield opening, the windshield being configured as a single, continuous panel that extends across an entirety of the front wall and along at least the first front corner and the second front corner.

10. The cab of claim 9, wherein the windshield opening has a ledge extending along a peripheral edge thereof, wherein the ledge is recessed relative to the front wall, the first sidewall, and the second sidewall, wherein a periphery of the windshield interfaces with and extends along the ledge such that the windshield is substantially flush with the front wall, the first sidewall, and the second sidewall, and wherein the periphery of the windshield is bonded to the ledge without using a gasket.

11. The cab of claim 8, wherein a first rear corner is defined between the rear wall and the first sidewall, wherein the first sidewall defines a first rear opening proximate the first rear corner, wherein a second rear corner is defined between the rear wall and the second sidewall, and wherein the second sidewall defines a second rear opening proximate the second rear corner, further comprising a first rear window received by the first rear opening and a second rear window received by the second rear opening.

12. The cab of claim 8, wherein the front wall defines a lip and a recess positioned beneath and behind the lip, wherein the lip and the recess are positioned beneath a windshield of the cab, further comprising:
   a bezel engaging the lip and covering the recess; and
   a windshield wiper assembly including:
      a pair of actuators positioned within the recess and tucked behind the lip, each of the pair of actuators including a drive shaft extending through the front wall between the lip and the windshield; and
      a pair of wipers, each of the pair of wipers coupled to the drive shaft of a respective one of the pair of actuators.

13. The cab of claim 12, wherein each of the pair of actuators includes a motor and a linkage assembly coupling the motor to the drive shaft, wherein the pair of actuators are configured to pivot the pair of wipers between a stowed position and an end of stroke position, and wherein, when in the stowed position, the pair of wipers overlap each other and are vertically aligned but offset from each other.

14. The cab of claim 8, further comprising a driver seat positioned within an interior of the cab, wherein:
   a visibility assessment region defined about the cab has:
      (a) a central zone (i) that extends 2 meters forward from the front wall and (ii) that extends laterally across a width of the cab;
      (b) a first side zone (i) that extends 2 meters outward from the first sidewall, (ii) that extends 2 meters forward from the front wall, and (iii) that extends 1 meter rearward of the driver seat when the driver seat is in a position to accommodate an operator in a 5th percentile of height for women;
      (c) a second side zone (i) that extends 4.5 meters outward from the second sidewall, (ii) that extends 2 meters forward from the front wall, and (iii) that extends 1 meter rearward of the driver seat when the driver seat is in the position to accommodate the operator in the 5th percentile of height for women; and
      (d) a height of about 1.24 meters; and
   a visibility profile for the visibility assessment region determined from the driver seat from an ocular point of the operator in the 5th percentile of height for women provides a visibility block of less than 27 cubic meters.

15. A cab for a refuse vehicle, the cab comprising:
   a front wall;
   a rear wall;
   a first sidewall extending between first ends of the front wall and the rear wall, wherein a first front corner is defined between the front wall and the first sidewall, wherein a first rear corner is defined between the rear wall and the first sidewall, and wherein the first sidewall defines a first door opening;
   a second sidewall extending between opposing second ends of the front wall and the rear wall, wherein a second front corner is defined between the front wall and the second sidewall, wherein a second rear corner is defined between the rear wall and the second sidewall, wherein the second sidewall defines a second door opening, wherein at least the front wall, the first front corner, and the second front corner cooperatively define a windshield opening;
   a windshield received by the windshield opening, the windshield being configured as a single, continuous panel that extends across an entirety of the front wall and along at least the first front corner and the second front corner;
   a first door positioned over the first door opening; and
   a second door positioned over the second door opening, wherein each of the first door and the second door includes:
      a door panel; and
      a peep window positioned beneath proximate a lower end of the door panel, the peep window including an interior windowpane and exterior windowpane, wherein one or more portions of the interior windowpane and one or more portions of the exterior windowpane are at least one of vertically offset or horizontally offset.

16. The cab of claim 15, wherein the interior windowpane and the exterior windowpane have different shapes relative to one another.

17. The cab of claim 15, wherein the front wall defines a lip and a recess positioned beneath and behind the lip, wherein the lip and the recess are positioned beneath the windshield of the cab, further comprising:
   a bezel engaging the lip and covering the recess; and
   a windshield wiper assembly including:
      a pair of actuators positioned within the recess and tucked behind the lip, each of the pair of actuators including a drive shaft extending through the front wall between the lip and the windshield; and
      a pair of wipers, each of the pair of wipers coupled to the drive shaft of a respective one of the pair of actuators.

18. The cab of claim 15, further comprising a driver seat positioned within an interior of the cab, wherein:
   a visibility assessment region defined about the cab has:
      (a) a central zone (i) that extends 2 meters forward from the front wall and (ii) that extends laterally across a width of the cab;
      (b) a first side zone (i) that extends 2 meters outward from the first sidewall, (ii) that extends 2 meters forward from the front wall, and (iii) that extends 1 meter rearward of the driver seat when the driver seat is in a position to accommodate an operator in a 5th percentile of height for women;
      (c) a second side zone (i) that extends 4.5 meters outward from the second sidewall, (ii) that extends 2 meters forward from the front wall, and (iii) that extends 1 meter rearward of the driver seat when the driver seat is in the position to accommodate the operator in the 5th percentile of height for women; and
      (d) a height of about 1.24 meters; and
   a visibility profile for the visibility assessment region determined from the driver seat from an ocular point of the operator in the 5th percentile of height for women provides a visibility block of less than 27 cubic meters.

19. A cab for a refuse vehicle, the cab comprising:
a front wall;
a rear wall;
a first sidewall extending between first ends of the front wall and the rear wall, wherein a first front corner is defined between the front wall and the first sidewall, wherein a first rear corner is defined between the rear wall and the first sidewall, and wherein the first sidewall defines a first rear opening proximate the first rear corner and a first door opening;
a second sidewall extending between opposing second ends of the front wall and the rear wall, wherein a second front corner is defined between the front wall and the second sidewall, wherein a second rear corner is defined between the rear wall and the second sidewall, wherein the second sidewall defines a second rear opening proximate the second rear corner and a second door opening, wherein at least the front wall, the first front corner, and the second front corner cooperatively define a windshield opening;
a windshield received by the windshield opening, the windshield being configured as a single, continuous panel that extends across an entirety of the front wall and along at least the first front corner and the second front corner;
a first rear window received by the first rear opening;
a second rear window received by the second rear opening;
a first door positioned over the first door opening; and
a second door positioned over the second door opening, wherein each of the first door and the second door includes:
a door panel;
an overhead window positioned proximate an upper end of the door panel;
a main window positioned beneath the overhead window; and
a peep window positioned beneath the main window and proximate a lower end of the door panel, the peep window including an interior windowpane and exterior windowpane, wherein one or more portions of the interior windowpane and one or more portions of the exterior windowpane are at least one of vertically offset or horizontally offset.

20. The cab of claim 19, wherein the interior windowpane and the exterior windowpane have different shapes relative to one another.

* * * * *